United States Patent
Park et al.

(10) Patent No.: US 12,108,403 B2
(45) Date of Patent: Oct. 1, 2024

(54) METHOD AND APPARATUS FOR TRANSMITTING AND RECEIVING DATA IN WIRELESS COMMUNICATION NETWORK

(71) Applicant: Samsung Electronics Co., Ltd., Suwon-si (KR)

(72) Inventors: Sungjin Park, Suwon-si (KR); Jinhyun Park, Suwon-si (KR); Jinyoung Oh, Suwon-si (KR); Jonghyun Bang, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/061,503

(22) Filed: Oct. 1, 2020

(65) Prior Publication Data

US 2021/0105809 A1 Apr. 8, 2021

(30) Foreign Application Priority Data

| Oct. 4, 2019 | (KR) | 10-2019-0123311 |
| Nov. 8, 2019 | (KR) | 10-2019-0142999 |
| Feb. 7, 2020 | (KR) | 10-2020-0015009 |

(51) Int. Cl.
| *H04W 72/23* | (2023.01) |
| *H04L 1/00* | (2006.01) |
| *H04L 69/32* | (2022.01) |
| *H04L 69/324* | (2022.01) |

(52) U.S. Cl.
CPC ........... *H04W 72/23* (2023.01); *H04L 1/0006* (2013.01); *H04L 69/324* (2013.01)

(58) Field of Classification Search
None
See application file for complete search history.

(56) References Cited

U.S. PATENT DOCUMENTS

| 9,210,670 B2 * | 12/2015 | Papasakellariou .... H04W 52/34 |
| 2014/0206362 A1 | 7/2014 | Xu et al. |
| 2015/0208392 A1 * | 7/2015 | Park ...................... H04W 72/23 370/329 |

(Continued)

FOREIGN PATENT DOCUMENTS

EP 2733875 A2 * 5/2014 ......... H04L 27/2601

OTHER PUBLICATIONS

European Patent Office, "Supplementary European Search Report," dated Aug. 25, 2022, in connection with European Patent Application No. 20872963.2, 9 pages.

(Continued)

*Primary Examiner* — Yemane Mesfin
*Assistant Examiner* — Jeff Banthrongsack

(57) ABSTRACT

A data communication method of a user equipment includes receiving a higher layer signal indicating a change of a determination standard of a start symbol to which a physical downlink shared channel (PDSCH) is assigned, detecting a downlink control information (DCI) format including PDSCH scheduling information from a physical downlink control channel (PDCCH), and determining the start symbol to which the PDSCH is assigned, based on at least one of information about the DCI format, mapping type information of the PDSCH, or an offset value between a slot in which the PDCCH is located and a slot in which the PDSCH is located.

20 Claims, 18 Drawing Sheets

(56) References Cited

U.S. PATENT DOCUMENTS

| | | |
|---|---|---|
| 2017/0251457 A1 | 8/2017 | Kim et al. |
| 2018/0019843 A1* | 1/2018 | Papasakellariou .... H04L 1/1812 |
| 2019/0082448 A1 | 3/2019 | Nogami et al. |
| 2019/0149365 A1* | 5/2019 | Chatterjee ............ H04L 5/0044 370/329 |

OTHER PUBLICATIONS

Examination Report issued Feb. 13, 2024, in connection with Indian Patent Application No. 202237016951, 6 pages.

International Search Report and Written Opinion of the International Searching Authority dated Jan. 21, 2021, in connection with International Application No. PCT/KR2020/013299, 10 pages.

CATT, "On PDSCH and PUSCH resource allocation", R1-1800257, 3GPP TSG RAN WG1 Meeting AH 1801, Vancouver, Canada, Jan. 2018, 23 pages.

Nokia, "CR to 38.214 capturing the RAN1#92bis and RAN1#93 meeting agreements", R1-1807958, 3GPP TSG-RAN1 Meeting #93, Busan, Korea, May 2018, 89 pages.

Communication pursuant to Article 94(3) EPC issued Aug. 8, 2024, in connection with European Patent Application No. 20872963.2, 9 pages.

\* cited by examiner

METHOD AND APPARATUS FOR TRANSMITTING AND RECEIVING DATA IN WIRELESS COMMUNICATION NETWORK

CROSS-REFERENCE TO RELATED APPLICATIONS

This application is based on and claims priority under 35 U.S.C. § 119 to Korean Patent Application No. 10-2019-0123311 filed on Oct. 4, 2019, Korean Patent Application No. 10-2019-0142999 filed on Nov. 8, 2019, and Korean Patent Application No. 10-2020-0015009 filed on Feb. 7, 2020 in the Korean Intellectual Property Office, the disclosures of which are herein incorporated by reference in their entirety.

BACKGROUND

1. Field

The disclosure relates to a wireless communication system, and more particularly, to a method and apparatus for transmitting and receiving data in a wireless communication system.

2. Description of Related Art

In order to meet demand with respect to wireless data traffic, which is explosively increasing due to the commercialization of the 4th generation (4G) communication system, an improved 5th generation (5G) communication system or pre-5G communication system has been developed. For this reason, the 5G communication system or the pre-5G communication system is called a beyond 4G network communication system or a post-long term evolution (LTE) system. To achieve a high data rate, the implementation of the 5G communication system in an ultra-high-frequency (mm Wave) band, for example, a 60 giga-Hertz (GHz) band, has been considered. In order to mitigate the path loss of radio waves and increase the transmission distance of radio waves in the ultra-high frequency band, beamforming, massive multiple input, multiple output (MIMO), full dimensional MIMO (FD-MIMO), array antenna, analog beamforming, and large scale antenna techniques are being discussed in relation to the 5G communication system. Furthermore, for the improvement of a system network, in the 5G communication system, technologies such as advanced small cells, advanced small cells, a cloud radio access network (cloud radio access network (RAN)), an ultra-dense network, device to device (D2D) communication, wireless backhaul, a moving network, cooperative communication, coordinated multi-points (CoMP), reception interference cancellation, and the like, have been developed. In addition, in the 5G system, hybrid frequency shift keying and quadrature amplitude modulation (FQAM) and sliding window superposition coding (SWSC), which are advanced coding modulation (ACM) methods, and filter bank multi carrier (FBMC), non-orthogonal multiple access (NOMA), and sparse code multiple access (SCMA), which are advanced access techniques, are being developed.

The Internet is evolving from a human-centered connection network where humans generate and consume information, to an Internet of Things (IOT) network where information is exchanged and processed between distributed components such as things. Internet of Everything (IoE) technology, in which big data processing technology through a connection to a cloud server and the like is combined with the IoT technology, is also emerging. In order to implement the IoT, technical components such as sensing technology, wired/wireless communication and network infrastructure, service interface technology, and security technology are required. Recently, a sensor network, machine to machine (M2M) communication, machine type communication (MTC), and the like, for connection between things are being studied. In the IoT environment, intelligent Internet technology (IT) services that create new values in human life by collecting and analyzing data generated from connected things may be provided. The IoT may be applied to the fields of smart homes, smart buildings, smart cities, smart cars or connected cars, smart grids, health care, smart home appliances, advanced medical services, and the like, through fusion and convergence of existing information technology (IT) technology and various industries.

Accordingly, various attempts have been made to apply the 5G communication system to the IoT network. For example, technologies such as a sensor network, M2M communication, MTC, and the like, are being implemented by the 5G communication technologies such as beamforming, MIMO, array antennas, and the like. The use of the cloud RAN as the above-mentioned big data processing technology may be an example of the convergence of the 5G technology and the IoT technology.

As described above, with the development of a wireless communication system, a data transmitting and receiving method for network cooperative communication is needed.

SUMMARY

The disclosed embodiment provides an apparatus and method for effectively providing a service in a wireless communication system.

Additional aspects will be configured forth in part in the description which follows and, in part, will be apparent from the description, or may be learned by practice of the presented embodiments of the disclosure.

According to an aspect of the disclosure, a data communication method of a user equipment includes receiving a higher layer signal indicating a change of a determination standard of a start symbol to which a physical downlink shared channel (PDSCH) is assigned, detecting a downlink control information (DCI) format including PDSCH scheduling information from a physical downlink control channel (PDCCH), and determining the start symbol to which the PDSCH is assigned, based on at least one of information about the DCI format, mapping type information of the PDSCH, or an offset value between a slot in which the PDCCH is located and a slot in which the PDSCH is located.

According to an embodiment, the determining of the start symbol to which the PDSCH is assigned may include determining a start symbol to which the PDSCH is assigned, based on a first symbol at a monitoring point of the PDCCH where the DCI format is detected, when the PDSCH mapping type is a mapping type B, the offset value is 0, and the DCI format is a DCI format including a cyclic redundancy check (CRC) scrambled to one of a cell radio network temporary identifier (C-RNTI), a modulation and coding scheme cell RNTI (MCS-RNTI), and a configured scheduling (CS-RNTI).

According to an embodiment, the determining of the start symbol to which the PDSCH is assigned may include determining the start symbol to which the PDSCH is assigned, based on the first symbol at the monitoring point of the PDCCH where the DCI format is detected, when subcarrier spacings of the PDCCH and the PDSCH are the same.

According to an embodiment, the determining of the start symbol to which the PDSCH is assigned may include determining the start symbol to which the PDSCH is assigned, based on the first symbol at the monitoring point of the PDCCH where the DCI format is detected, when cyclic prefixes of the PDCCH and the PDSCH are the same.

According to an embodiment, the determining of the start symbol to which the PDSCH is assigned may include determining the start symbol to which the PDSCH is assigned, based on a first symbol of a slot in which the PDSCH is scheduled, when the PDSCH mapping type is not a B type, the offset value is not 0, and the DCI format is not a DCI format including a CRC scrambled to one of a C-RNTI, a MCS-RNTI, and a CS-RNTI.

According to an embodiment, the determining of the start symbol to which the PDSCH is assigned may include determining the start symbol to which the PDSCH is assigned, based on a first symbol of a slot in which the PDSCH is scheduled, when cross scheduling of the PDCCH and the PDSCH is configured.

According to an embodiment, when a higher layer signal indicating a change of a reference point of the start symbol to which the PDSCH is assigned is not received, the determining of the start symbol to which the PDSCH is assigned may include determining the start symbol to which the PDSCHI is assigned, based on a first symbol of a slot in which the PDSCH is scheduled.

According to another aspect of the disclosure, a data communication method of a base station includes transmitting a higher layer signal indicating a change of a determination standard of a start symbol to which a physical downlink shared channel (PDSCH) is assigned, and providing a downlink control information (DCI) format including PDSCH scheduling information through a physical downlink control channel (PDCCH), wherein the start symbol to which the PDSCH is assigned is determined based on at least one of information about the DCI format, mapping type information of the PDSCH, or an offset value between a slot in which the PDCCH is located and a slot in which the PDSCH is located.

According to an embodiment, when the PDSCH mapping type is a mapping type B, the offset value is 0, and the DCI format is a DCI format including a cyclic redundancy check (CRC) scrambled to one of a radio network temporary identifier (C-RNTI), a MCS-RNTI, and a CS-RNTI, and subcarrier spacings of the PDCCH and the PDSCH are the same, the start symbol to which the PDSCH is assigned may be determined based on a first symbol at a monitoring point of the PDCCH where the DCI format is detected.

According to an embodiment, when cross scheduling of the PDCCH and the PDSCH is configured, or subcarrier spacings of the PDCCH and the PDSCH are different from each other, a start symbol to which the PDSCH is assigned may be determined based on a first symbol of a slot in which the PDSCH is scheduled.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
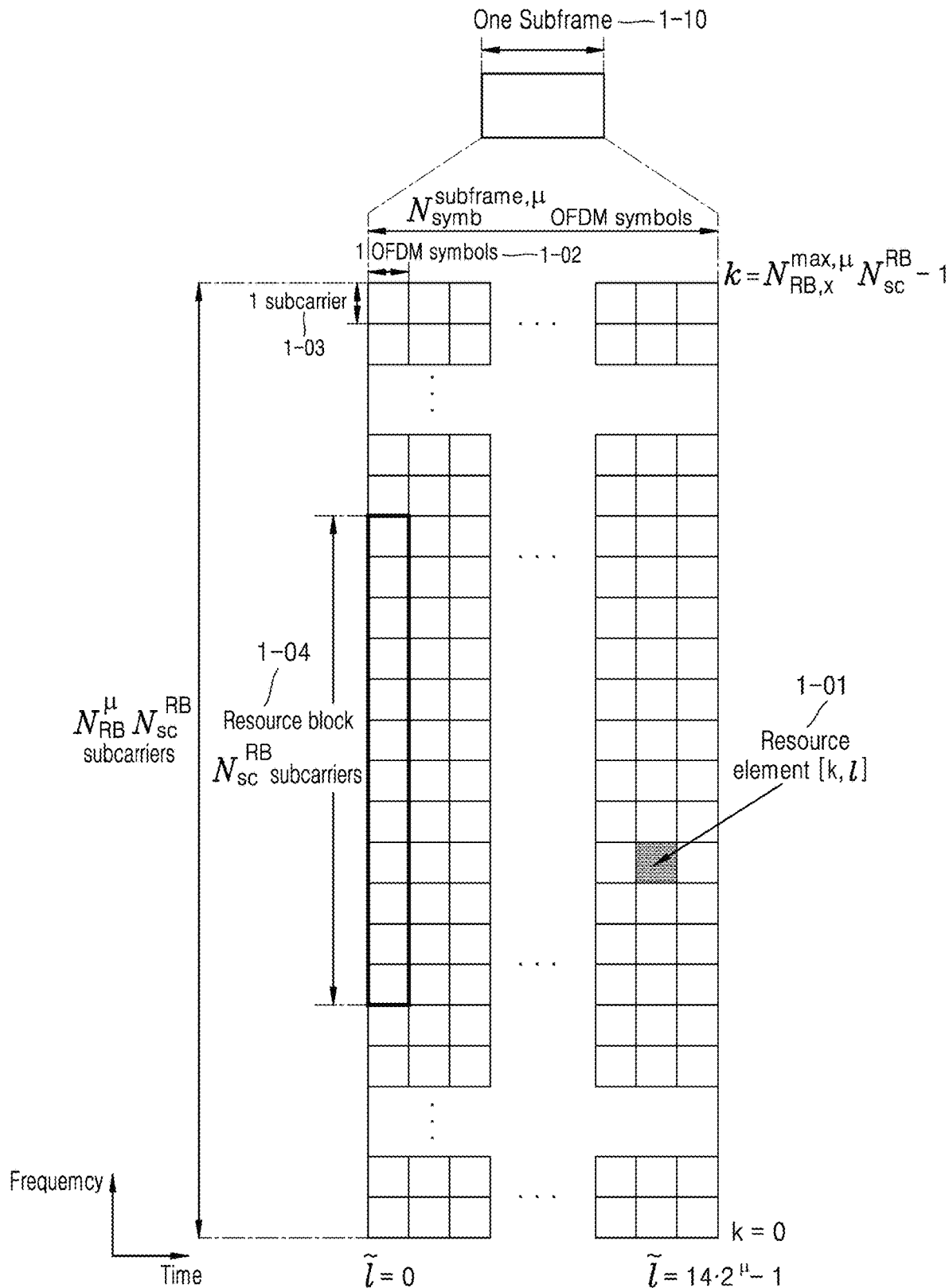
FIG. 1 illustrates a time-frequency domain transmission structure of long term evolution (LTE or evolved universal terrestrial radio access (E-UTRA)), LTE-Advanced (LTE-A), new radio (NR), or a wireless communication system similar thereto, according to an embodiment of the disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the embodiments of the disclosure are described in detail with reference to the accompanying drawings.

In the following description, descriptions of technical contents that are well-known in the art to which the disclosure pertains and are not directly related to the disclosure will be omitted because they would unnecessarily obscure the subject matters of the disclosure. This is to prevent unnecessary descriptions from obscuring the subject matters of the disclosure and to further clearly describe the gist of the disclosure.

For the same reason, each element illustrated in the drawings may be exaggerated, omitted, or schematically illustrated. Furthermore, the illustrated size of each element does not substantially reflect its actual size. In each drawing, like reference numerals denote like or corresponding elements.

Advantages and features of the disclosure and methods of accomplishing the same may be understood more readily by reference to the following detailed description of exemplary embodiments and the accompanying drawings. The disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the disclosure will only be defined by the appended claims. Like reference numerals refer to like elements throughout the specification.

Throughout the disclosure, the expression "at least one of a, b or c" indicates only a, only b, only c, both a and b, both a and c, both b and c, all of a, b, and c, or variations thereof.

Examples of a user equipment (UE) may include a UE, a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that blocks of flowcharts and combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

As used herein, the term "unit" means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Accordingly, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. As used herein, the "unit" may include at least one processor.

Hereinafter, the operation principle of the disclosure is described below with the accompanying drawings. Furthermore, in the following description, when detailed descriptions about related well-known functions or structures are determined to make the gist of the disclosure unclear, the detailed descriptions will be omitted herein. The terms used in the disclosure have been selected from currently widely used general terms in consideration of the functions in the disclosure. However, the terms may vary according to the intention of one of ordinary skill in the art, case precedents, and the advent of new technologies. Accordingly, the terms used in the disclosure are defined based on their meanings in relation to the contents discussed throughout the specification, not by their simple meanings. Hereinafter, a base station is a subject performing resource assignment of a UE and may be at least one of nodes on gNode B, eNode B, Node B, a base station (BS), a wireless connection unit, a base station controller, or a network. UE may include a user equipment (UE), a mobile station (MS), a cellular phone, a smartphone, a computer, a multimedia system capable of performing a communication function, or the like. However, the disclosure is not limited to the above examples.

Hereinafter, the disclosure describes a technology that UE receives broadcast information from a base station in a wireless communication system. The disclosure relates to a communication technique and a system thereof for the convergence of a 5G communication system for supporting a higher data transmission rate after the 4G system and the IoT technology. The disclosure may be applied to intelligent services, for example, smart homes, smart buildings, smart cities, smart cars or connected cars, healthcare, digital education, retail business, security and safety related services, etc., based on the 5G communication technology and IoT-related technology.

Hereinafter, terms referring to broadcast information, terms referring to control information, terms related to a communication coverage, terms referring to a state change, for example, an event, terms referring to network entities, terms referring to messages, terms referring to components of a device, and the like are, which are used in the description, are presented for convenience of description. Accordingly, the disclosure is not limited to the terms described later, and other terms having an equivalent technical meaning may be used.

Hereinafter, for convenience of explanation, some terms and names defined in the 3rd generation partnership project long term evolution (3GPP LTE) standard may be used. However, the disclosure is not limited by the terms and names, and may be equally applied to systems conforming to other standards.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), and LTE-advanced (LTE-A) of 3GPP, high rate packet data (HRPD) and ultra-mobile broadband (UMB) of 3GPP2, and 802.16e of the Institute of Electrical and Electronics Engineers (IEEE).

As a representative example of the broadband wireless communication systems, LTE systems employ orthogonal frequency-division multiplexing (OFDM) on downlink (DL), and employ single-carrier frequency-division multiple access (SC-FDMA) on uplink (UL). The UL refers to a radio link for transmitting data or control signals from a terminal, a UE, or a MS to an eNode B or a BS, and the DL refers to a radio link for transmitting data or control signals from the BS to the UE. The above-described dual connectivity schemes distinguish between data or control information of different users by assigning and using time-frequency resources for the data or control information of the users not to overlap each other, i.e., to achieve orthogonality therebetween.

As a future communication system after the LTE, that is, the 5G communication system, supports services satisfying various requirements because various requirements regarding a user and a service provider are freely reflected. Services considered for the 5G communication system include enhanced mobile broadband (eMBB) communication, massive machine type communication (mMTC), ultra-reliability low latency communication (URLLC), etc.

According to an embodiment, eMBB aims to provide a more improved data transmission rate than the data transmission rate supported by the existing LTE, LTE-A or LTE-Pro. For example, in the 5G communication system, eMBB may provide a peak data rate of 20 Gbps in the DL and the peak data rate of 10 Gbps in the UL, in terms of one single base station. Simultaneously, an actual user perceived data rate of an increased UE is provided. To satisfy the requirements, improvement of transmitting and receiving technology including more enhanced multi input multi output (MIMO) transmission technology is needed. Also, the data transmission rate required by the 5G communication system may be satisfied by using a frequency bandwidth wider than 20 MHz in a frequency band of 3-6 GHz or 6 GHz or higher, instead of the 2 GHz band used by the current LTE.

Simultaneously, in the 5G communication system, mMTC is considered to support application services such as IoT. In order to efficiently provide IoT, mMTC may require large-scale UE access support within a cell, improved UE coverage, improved battery time, and reduced UE costs. IoT is attached to various sensors and various devices to provide communication functions, and thus the IoT may be able to support a large number of UEs, for example, 1,000,000 UE/km$^2$, within a cell. Also, a UE supporting mMTC is likely to be located in a shaded area not covered by a cell, such as the basement of a building, due to the characteristics of a service, and thus may require a wider coverage compared with other services provided in the 5G communication system. A UE supporting mMTC is configured as a low-cost UE, and as it is difficult to frequently exchange the battery of UE, a very long battery lifetime may be required.

Finally, for URLLC, as a cellular-based wireless communication service used for a specific purpose (mission-critical), or services used for remote control for robots or machinery, industrial automation, and unmanned aerial vehicles, remote health control, emergency alert, etc., a communication providing ultra-low latency and ultra-reliability is provided. For example, a service supporting URLLC satisfies a wireless connection delay time (air interface latency) less than 1 millisecond, and simultaneously has a requirement of a packet error rate of $10^{-5}$ or less. Accordingly, for a service supporting URLLC, the 5G system provides a transmission time interval (TTI) smaller than other services, and simultaneously needs a design requirement of allocating a wide resource in a frequency band. However, the above-described mMTC, URLLC, and eMBB are only examples of different service types, and service types subject to the disclosure are not limited to the above-described examples.

In the above-described 5G communication system, services being considered may be provided by being converged with each other based on one framework. In other words, for efficient resource management and control, the services may be controlled and transmitted by being integrated in one system, rather than independently operated.

Furthermore, the LTE, LTE-A, LTE Pro, or new radio (NR) system is described below as an example of the embodiment of the disclosure, but the embodiment of the disclosure may be applied to other communication systems having a similar technical background or channel form. Furthermore, the embodiment of the disclosure may be applied to other communication systems through some modifications within the scope of the disclosure according to the judgment of a person with skilled technical knowledge.

The disclosure relates to a method and apparatus for repeatedly transmitting data and control signals between a plurality of transmission nodes and a UE performing cooperative communication for improvement of communication reliability.

According to the disclosure, when network cooperative communication is used in a wireless communication system, the reliability of data/control signal that a UE receives may be improved.

Hereinafter, a frame structure of the 5G system is described in detail with reference to the drawings.

FIG. 1 illustrates a basic structure of a time-frequency domain that is a wireless resource area where data or a control channel is transmitted in the 5G system, according to an embodiment of the disclosure.

Referring to FIG. 1, the horizontal axis denotes a time domain and the vertical axis denotes a frequency domain. In the time and frequency domain, a basic unit of resource is a resource element (RE, 1-01) which may be defined to be 1 OFDM symbol 1-02 on the time axis and 1 subcarrier 1-03 on the frequency axis. In the frequency domain, $N\_sc^{RB}$, for example, 12, continuous REs may constitute one resource block (RB) 1-04.

Figure 2:
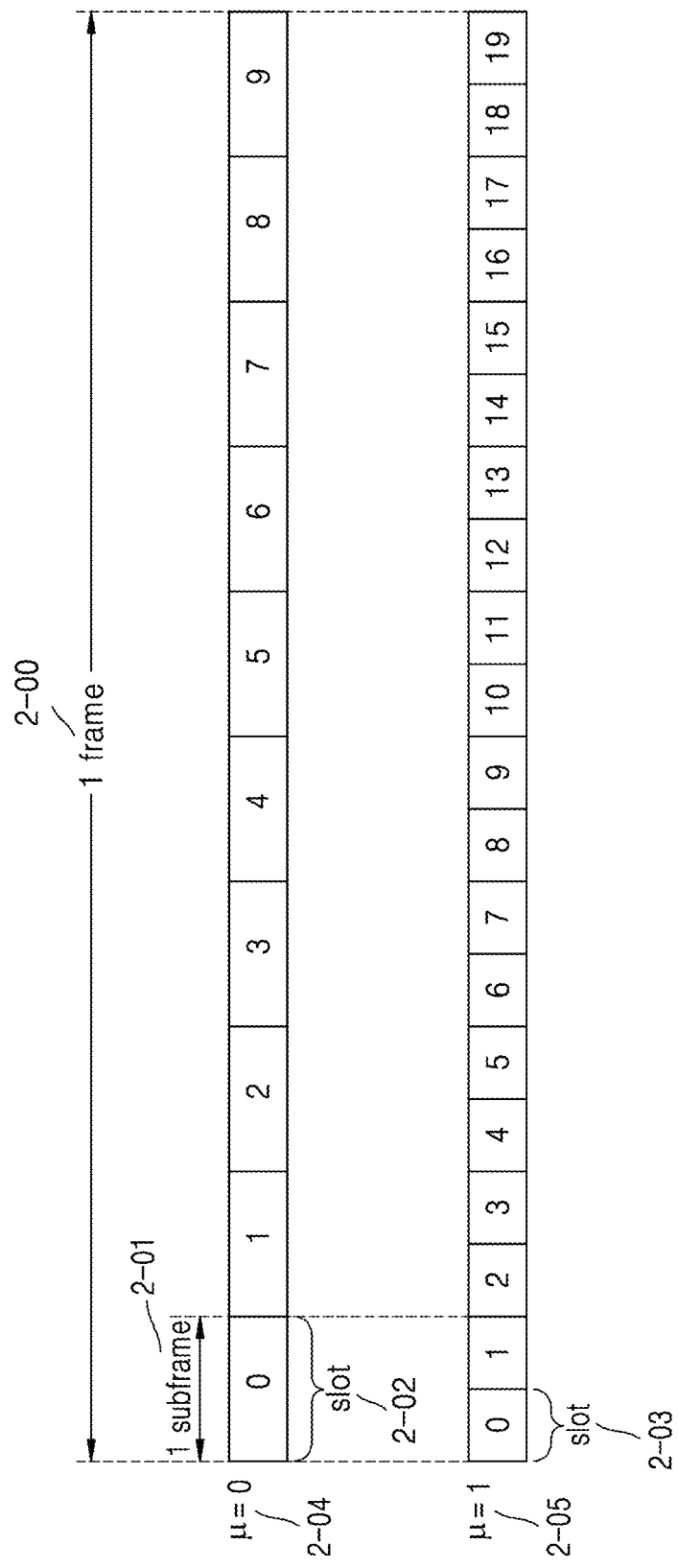
FIG. 2 illustrates a frame, a subframe, and a slot structure in 5th generation (5G), according to an embodiment of the disclosure.

FIG. 2 illustrates a frame, a subframe, a slot structure in 5G system, according to an embodiment of the disclosure.

Referring to FIG. 2, an example of a structure of a frame 2-00, a subframe 2-01, and a slot 2-02 is illustrated. 1 frame 2-00 may be defined to be 10 milliseconds (ms). 1 subframe 2-01 may be defined to be 1 ms, and accordingly, the 1 frame 2-00 may include a total of 10 subframes 2-01. 1 slot 2-02 or 2-03 may be defined to be 14 OFDM symbols (that is, the number of symbols per 1 slot ($N_{symb}^{slot}$)=14). The 1 subframe 2-01 may include one or a plurality of slots 2-02 or 2-03, and the number of slots 2-02 or 2-03 per 1 subframe 2-01 may vary according to a configuration value μ 2-04 or 2-05 to a subcarrier spacing. In an example of FIG. 2, cases in which a subcarrier spacing configuration value is that μ=0 (2-04) and μ=1 (2-05) are illustrated. When μ=0 (2-04), the 1 subframe 2-01 may include one slot 2-02, and when μ=1 (2-05), the 1 subframe 2-01 may include two slots 2-03. In other words, the number of slots per 1 subframe ($N_{slot}^{subframe,\mu}$) may vary according to the configuration value u to the subcarrier spacing, and the number of slots per 1 frame ($N_{slot}^{frame,\mu}$) may vary according thereto. $N_{slot}^{subframe,\mu}$ and $N_{slot}^{frame,\mu}$ according to the configuration value μ of each subcarrier spacing may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the NR system, one component carrier (CC) or serving cell may include a maximum 250 or more RBs. Accordingly, when a UE always receives all serving cell bandwidths as in the LTE, the power consumption of UE may be considerable, and to solve the matter, a base station configures the UE with one or more bandwidth parts (BWPs) so that the UE is supported to change a receiving domain in a cell. In the NR system, the base station may configure the UE with "initial BWP" that is a bandwidth of CORESET #0 or common search space (CSS) through a master information block (MIB). Then, the base station configures a first BWP of UE through radio resource control (RRC) signaling, and may provide at least one piece of BWP configuration information that may be indicated in the future through downlink control information (DCI). Then, the base station publicizes a BWP ID through the DCI to indicate the UE to use which one of the bands. When the UE does not receive the DCI in a currently allocated BWP over a specific time period, the UE may try to receive the DCI by returning to a "default BWP". According to an embodiment, the "default BWP" may be the same as or different from the "initial BWP".

Figure 3:
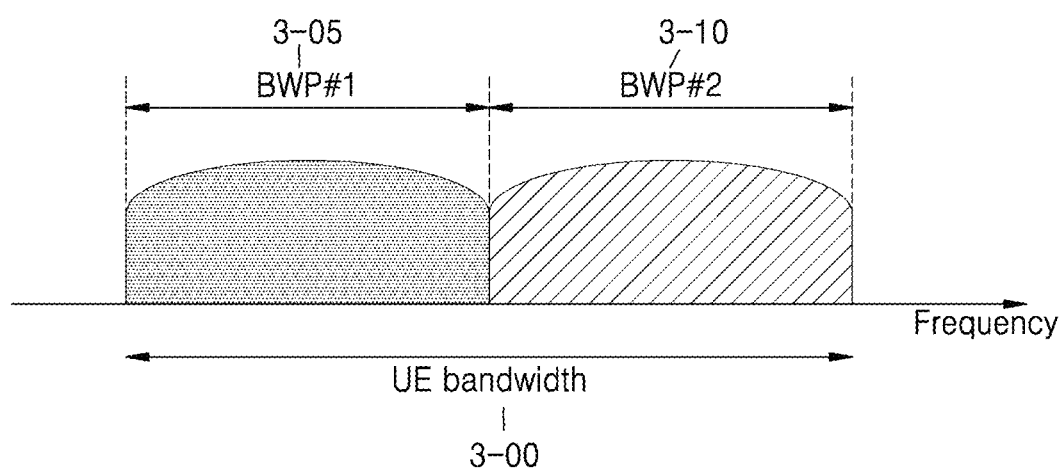
FIG. 3 illustrates a bandwidth part (BWP) configuration in a wireless communication system, according to an embodiment of the disclosure.

FIG. 3 illustrates a BWP configuration in a wireless communication system, according to an embodiment of the disclosure.

Referring to FIG. 3, an example is illustrated, in which a UE bandwidth 3-00 is configured to include two BWPs, that is, a bandwidth part #1 3-05 and a bandwidth part #2 3-10. The base station may configure the UE with one or a plurality of BWPs, and configure pieces of information as shown in Table 2 with respect to each BWP.

TABLE 2

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

The disclosure is not limited to the above example, and aside from the configuration information described in Table 2, various parameters related to the BWP may be configured in the UE. The above-described pieces of information may be transmitted by the base station to the UE through higher layer signaling, for example, the RRC signaling. At least one BWP among one or a plurality of configured BWPs may be activated. Whether to activate the configured BWP may be semi-statically transmitted from the base station to the UE through the RRC signaling, or dynamically through medium access control (MAC) control element (CE) or the DCI.

In the 5G communication system, configuration of a supported BWP may be used for various purposes.

According to an embodiment, when the bandwidth supported by the UE is less than a system bandwidth, only the bandwidth supported by the UE may be configured through the BWP configuration. For example, in Table 2, as the frequency position of BWP is configured in the UE, the UE may transmit and receive data in a specific frequency position in a system bandwidth.

Furthermore, according to an embodiment, to support different numerologies, the base station may configure the UE with a plurality of BWPs. For example, to support a UE with all data transmitting and receiving using a subcarrier spacing of 15 kHz and a subcarrier spacing of 30 kHz, two BWPs may be configured by using the respective subcarrier spacings of 15 kHz and 30 kHz. Frequency division multiplexing (FDM) may be performed on the different BWPs, and when data is to be transcend at a specific subcarrier spacing, a BWP that is configured to the subcarrier spacing may be activated.

Furthermore, according to an embodiment, to reduce the power consumption of UE, the base station may configure the UE with BWPs having bandwidths of different sizes. For example, when the UE supports a very large bandwidth, for example, a bandwidth of 100 MHZ, and always transmits and receives data with the bandwidth, very large power consumption may occur. In particular, for the UE to perform monitoring an unnecessary DL control channel with respect to a large bandwidth of 100 MHz in no traffic situation may be very inefficient in terms of power consumption. Thus, in order to reduce the power consumption of UE, the base station may configure the UE with a BWP of a relatively small bandwidth, for example, 20 mega-Hertz (MHz). In no traffic situation, the UE may perform a monitoring operation with a 20 MHz BWP, and when data is generated, the UE may transmit and receive data by using a BWP of 100 MHz according to the instruction of the base station.

Figure 4:
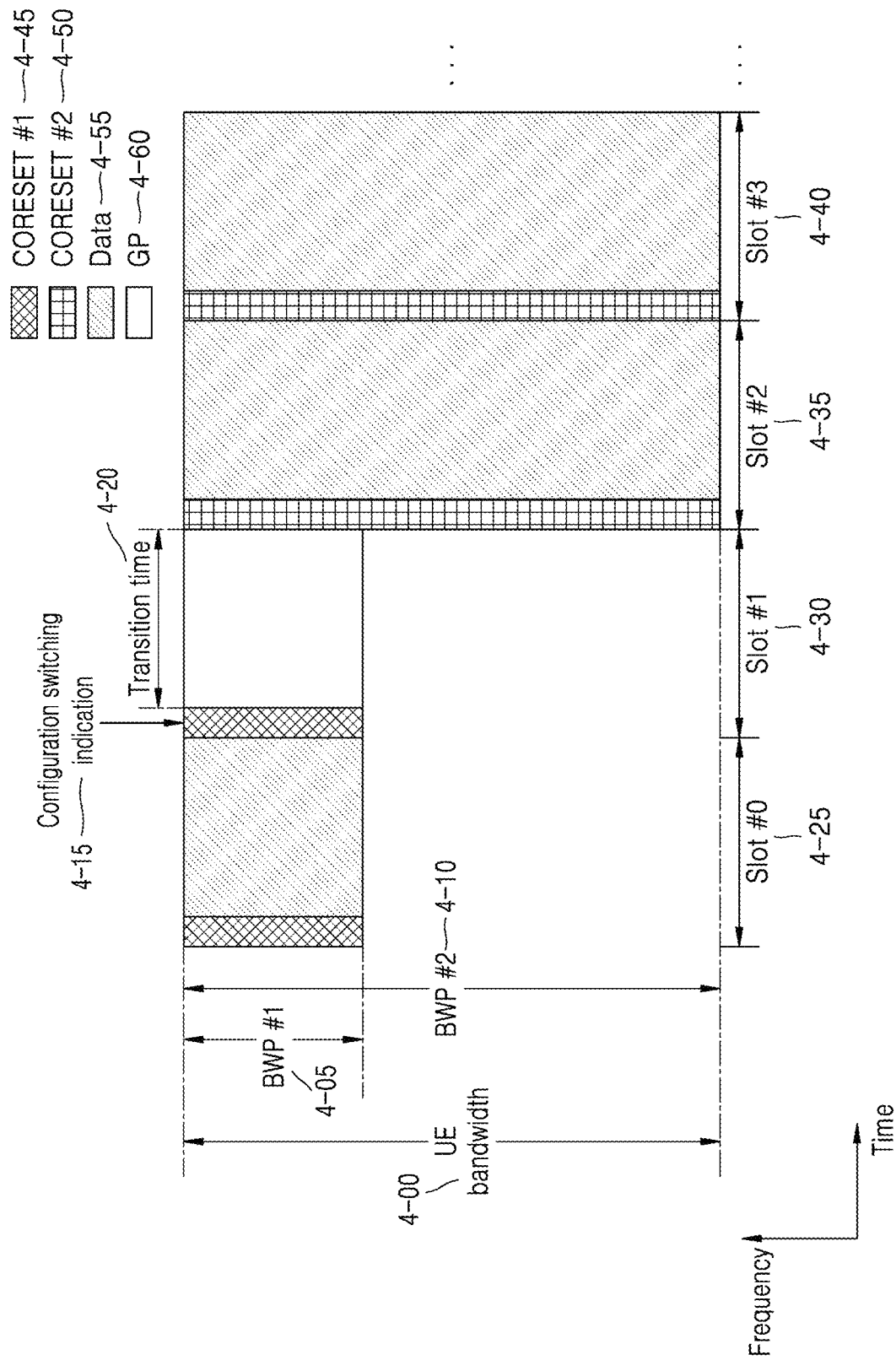
FIG. 4 illustrates bandwidth part indication and switching in a wireless communication system, according to an embodiment of the disclosure.

FIG. 4 illustrates BWP indication and switching in a wireless communication system, according to an embodiment of the disclosure.

Referring to FIG. 4, as described in the above-described Table 2, the base station may configure the UE with one or a plurality of BWPs, and as configurations of each BWP, information about the bandwidth of a BWP, the frequency position of a BWP, or the numerology of a BWP may be informed to the UE. FIG. 4 illustrates an example, in which two BWPs, that is, a BWP #1 4-05 and a BWP #2 4-10, in a UE bandwidth 4-00, are configured in one UE. Among the configured bandwidths, one or a plurality of BWPs may be activated, and in FIG. 4, an example, in which one BWP is activated may be considered. In FIG. 4, in a slot #0 4-25, among the configured BWPs, the BWP #1 4-05 is activated, and the UE may monitor a physical DL control channel (PDCCH) in a control resource set (CORESET) #1 4-45 configured in the BWP #1 4-05, and transmit and receive data 4-55 in the BWP #1 4-05. A control resource set where the UE receives the PDCCH may vary according to which BWP is activated among the configured BWPs, and accordingly, a bandwidth in which the UE monitors the PDCCH may vary.

The base station may additionally transmit an indicator to switch the BWP configuration to the UE. The switching of the BWP configuration may be regarded to be identical to an operation of activating a specific BWP, for example, a switching of activation from a BWP A to a BWP B. The base station may transmit to the UE a configuration switching indicator in a specific slot, the UE may receive from the base station the configuration switching indicator and then determine a BWP to be activated by applying a switched configuration according to the configuration switching indicator from a specific time point, and perform monitoring on the PDCCH in a control resource set configured to the activated BWP.

In FIG. 4, the base station may transmit to the UE a configuration switching indicator 4-15 that indicates a switch of the activated BWP from the existing BWP #1 4-05 to the BWP #2 4-10, in a slot slot #1 4-30. After receiving the configuration switching indicator, the UE may activate the BWP #2 4-10 according to the contents of the indicator. At this moment, a transition time 4-20 for switching of a BWP may be necessary, and accordingly, a time point to switch a BWP to be activated and apply may be determined. In FIG. 4, a case in which the transition time 4-20 of 1 slot is spent after receiving the configuration switching indicator 4-15 is illustrated. The data transmitting and receiving may not be performed in the transition time 4-20 (4-60). Accordingly, the BWP #2 4-10 is activated in a slot #2 4-35 and an operation of transmitting and receiving a control channel and data with the BWP may be performed.

The base station may previously configure the UE with one or a plurality of BWPs through the higher layer signaling, for example, the RRC signaling, and indicate activation in a method of mapping the configuration switching indicator 4-15 with one of the BWP configurations that are previously configured by the base station. For example, an indicator of [log$_2$N] bits may indicate by selecting one of previously configured N BWPs. Table 3 below describes an example of indicating configuration information about a BWP by using a 2-bit indicator.

TABLE 3

| Indicator Value | BWP Configuration |
| --- | --- |
| 00 | BWP Configuration Configured by Higher Layer Signaling A |
| 01 | BWP Configuration Configured by Higher Layer Signaling B |
| 10 | BWP Configuration Configured by Higher Layer Signaling C |
| 11 | BWP Configuration Configured by Higher Layer Signaling D |

The configuration switching indicator 4-15 regarding the BWP described in FIG. 4 may be transmitted to the UE from the base station in the form of MAC CE signaling or L1 signaling, for example, common DCI, group-common DCI, or UE-specific DCI. The disclosure is not limited to the above example.

At which time point the BWP activation is applied according to the configuration switching indicator 4-15 regarding the BWP described in FIG. 4 may be described as follows. The time point to apply the configuration switching may be determined by a predefined value, for example, from an N(≥1) slot after receiving a configuration switching indicator, by configuring, by the base station, the UE through the higher layer signaling, for example, the RRC signaling, by being partially included in the contents of the configuration switching indicator 4-15 and transmitted, or, by a combination of the above-described methods. After receiving the configuration switching indicator 4-15 regarding the BWP, the UE may apply the switched configuration from the time point obtained by the above-described method.

In the following description, the DL control channel of the 5G communication system is described in detail with reference to the drawings.

Figure 5:
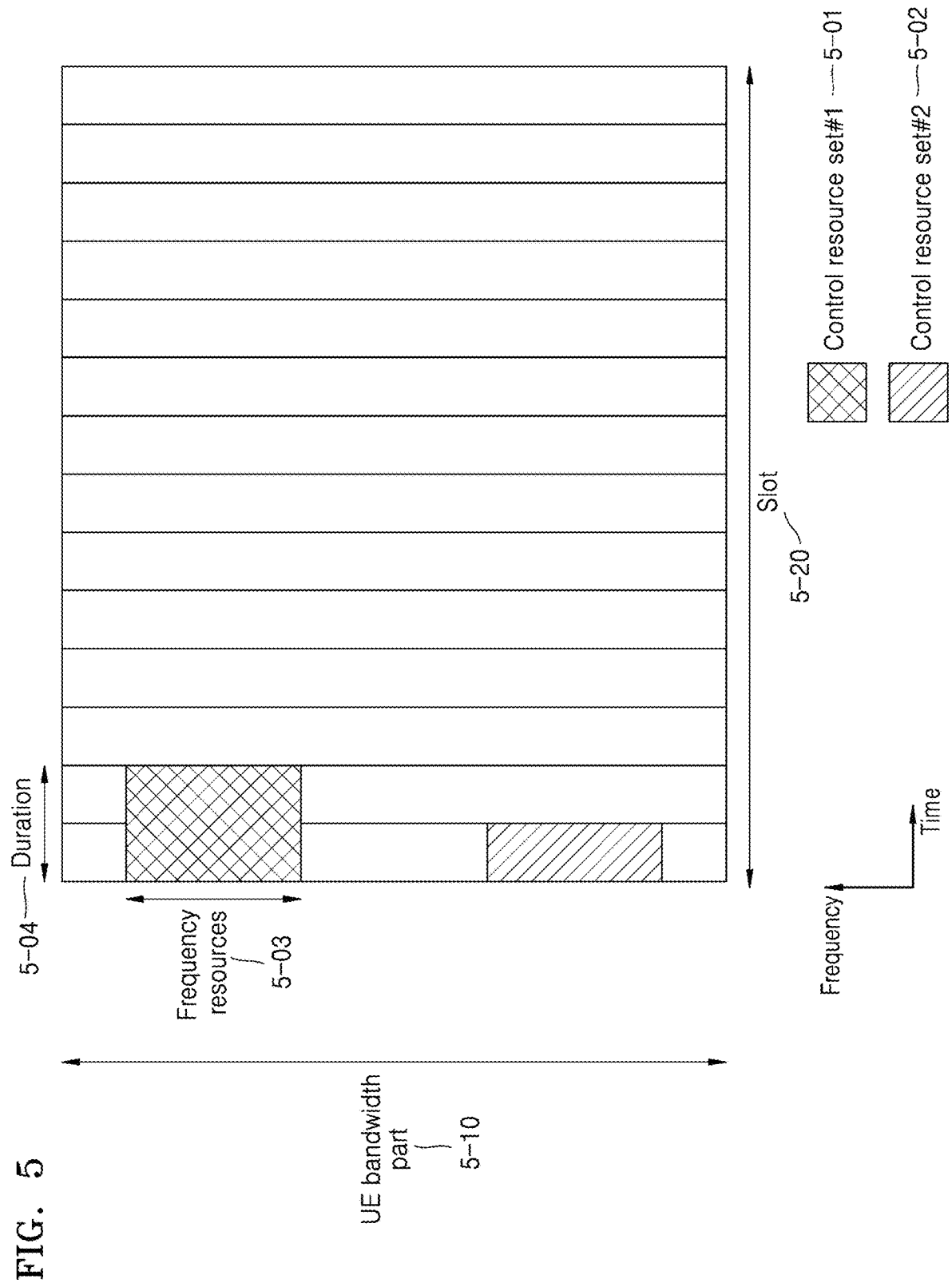
FIG. 5 illustrates a control resource set configuration of a downlink control channel in a wireless communication system, according to an embodiment of the disclosure.

FIG. 5 illustrates a control resource set configuration of a DL control channel in a wireless communication system, according to an embodiment of the disclosure.

Referring to FIG. 5, an example is illustrated, in which a BWP 5-10 of the UE is configured on the frequency axis, and two control resource sets, that is, a control resource set #1 5-01 and a control resource set #2 5-02, are configured in one slot 5-20 on the time axis. The control resource sets 5-01 and 5-02 may be configured on the frequency axis in a specific frequency resource 5-03 within all UE BWP 5-10. The control resource sets 5-01 and 5-02 may be configured on the time axis as one or a plurality of OFDM symbols, and defined to be a control resource set duration 5-04. In an example of FIG. 5, the control resource set #1 5-01 is configured to be a control resource set duration of two symbols, and the control resource set #2 5-02 is configured to be a control resource set duration of one symbol.

The above-described control resource set in the 5G system may be configured by the base station to the UE through the higher layer signaling, for example, the system information, the MIB, or the RRC signaling. Configuring the UE with a control resource set may mean providing the UE with information such as control resource set identity, the frequency position of a control resource set, the symbol length of a control resource set, or the like. For example, information of Table 4 may be included.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

The UE may monitor a DCI format for fallback and a DCI format for non-fallback with respect to the PUSCH or PDSCH. The DCI format for fallback may be composed of a predefined fixed filed between the base station and the UE, and the DCI format for non-fallback may include a configurable field.

The DCI may be transmitted through the PDCCH that is a physical downlink control channel through a channel coding and modulation process. Cyclic redundancy check (CRC) is attached to a DCI message payload, and the CRC

TABLE 4

```
ControlResourceSet ::=                              SEQUENCE {
 -- Corresponds to L1 parameter 'CORSET-ID'
 controlResourceSetId                               ControlResourceSetId,
 frequencyDomainResources                           BIT STRING (SIZE (45)),
 duration                                           INTEGER (1..maxCoReSetDuration),
 cce-REG-MappingType                                CHOICE {
   interleaved                                      SEQUENCE {
     reg-BundleSize                                 ENUMERATED {n2, n3, n6},
     precoderGranularity                            ENUMERATED {sameAsREG-bundle,
 allContiguousRBs},
     interleaverSize                                ENUMERATED {n2, n3, n6}
     shiftIndex
     INTEGER(0..maxNrofPhysicalResourceBlocks-1)          (
     )
   },
   nonInterleaved                                   NULL
 },
 tci-StatesPDCCH                                    SEQUENCE(SIZE (1..maxNrofTCI-StatesPDCCH))
   OF TCI-StateId            OPTIONAL,
 tci-PresentInDCI                                   ENUMERATED {enabled}
}
```

In Table 4, tci-StatesPDCCH (briefly referred to as a transmission configuration indicator (TCI) state) configuration information may include information of one or a plurality of synchronization signals (SS)/physical broadcast channel (PBCH) block indexes or channel state information reference signal (CSI-RS) indexes, which have a quasi co-located (QCL) relation with a demodulation reference signal (DMRS) that is transmitted in the control resource set.

Next, the DCI in the NR system is described in detail. In the NR system, scheduling information about the UL data or physical uplink shared channel (PUSCH), or downlink data or physical downlink shared channel (PDSCH), is transmitted from the base station to the UE through the DCI. For efficient control channel receiving of the UE, various forms of a DCI format are provided as shown in Table 5 below according to a purpose.

is scrambled into a radio network temporary identifier (RNTI) corresponding to the identity of the UE. Different RNTIs are used according to an objective of a DCI message, for example, UE-specific data transmission, power control command, or random access response. In other words, the RNTI is not explicitly transmitted and is transmitted by being included in a CRC calculation process. When receiving the DCI message transmitted on the PDCCH, the UE may check the CRC by using the assigned RNTI, and when a CRC checking result is correct, it may be seen that the UE transmitted the message to the UE.

For example, DCI for scheduling the PDSCH with respect to the system information (SI) may be scrambled to an SI-RNTI. DCI for scheduling the PDSCH with respect to a random access response (RAR) message may be scrambled to an RA-RNTI. DCI for scheduling the PDSCH with respect to a paging message may be scrambled to a P-RNTI. DCI for providing a slot format indicator (SFI) may be scrambled to an SFI-RNTI. DCI for providing transmit power control (TPC) may be scrambled to a TPC-RNTI. DCI for providing interruption (INT) with respect to a downlink data channel may be scrambled to an INT-RNTI.

DCI for scheduling a UE-specific PDSCH or PUSCH may be scrambled to a cell RNTI (C-RNTI).

A DCI format 0_0 may be used as fallback DCI for scheduling the PUSCH, and in this state, the CRC may be scrambled to the C-RNTI. The DCI format 0_0 in which the CRC is scrambled to the C-RNTI, may include, for example, pieces of information of Table 6 below.

TABLE 6

Identifier for DCI formats - [1] bit
Frequency domain resource assignment - $\lceil \log_2(N_{RB}^{UL,BWP}(N_{RB}^{UL,BWP} + 1)/2) \rceil$
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
UL/SUL indicator - 0 or 1 bit A DCI format 0_1 may be used as non-fallback DCI for scheduling the PUSCH, and in this state, the CRC may be scrambled to the C-RNTI. The DCI format 0_1 in which the CRC is scrambled to the C-RNTI, may include, for example, pieces of information of Table 7 below.

TABLE 7

Carrier indicator - 0 or 3 bits
DL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{DL,BWP}/P \rceil$ bits
    For resource allocation type 1, $\lceil \log_2(N_{RB}^{DL,BWP}(N_{RB}^{DL,BWP} + 1)/2) \rceil$ bits
Time domain resource assignment −1, 2, 3, or 4 bits
VRB-to-PRB mapping - 0 or 1 bit, only for resource allocation type 1.
    0 bit if only resource allocation type 0 is configured:
    1 bit otherwise.
Frequency hopping fing - 0 or 1 bit, only for resource allocation type 1.
    0 bit if only resource allocation type 0 is configured:
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook
    2 bits for dynamic HARQ-ACK codebook with single HARQ-ACK codebook
2nd downlink assignment index - 0 or 2 bits
    2 bits for dynamic HARQ-ACK codebook with two HARQ-ACK sub-codebooks
    0 bit otherwise.
TPC command for scheduled PUSCH - 2 bits SRS resource indicator - $\left\lceil \log_2\left(\sum_{k=1}^{L_{max}} \binom{N_{SRS}}{k}\right) \right\rceil$ or $\lceil \log_2(N_{SRS}) \rceil$ bits $\left\lceil \log_2\left(\sum_{k=1}^{L_{max}} \binom{N_{SRS}}{k}\right) \right\rceil$ bits for non-codebook based PUSCH transmission;

$\lceil \log_2(N_{SRS}) \rceil$ bits for codebook based PUSCH transmission.
Preceding information and number of layers up to 6 bits
Antenna ports - up to 5 bits
SRS request - 2 bits
CSI request - 0, 1, 2, 3, 4, 5, or 6 bits
CBG transmission information 0, 2, 4, 6, or 8 bits TABLE 7-continued PTRS-DMRS association - 0 or 2 bits.
beta_offset indicator - 0 or 2 bits
DMRS sequence initialization - 0 or 1 bit A DCI format 1_0 may be used as fallback DCI for scheduling the PDSCH, and in this state, the CRC may be scrambled to the C-RNTI. The DCI format 1_0 in which the CRC is scrambled to the C-RNTI, may include, for example, pieces of information of Table 8 below.

TABLE 8

Identifier for DCI formats - [1] bit
Frequency domain resource assignment - $\lceil \log_2(N_{RB}^{DL,BWP}(N_{RB}^{DL,BWP} + 1)/2) \rceil$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits A DCI format 1_1 may be used as non-fallback DCI for scheduling the PDSCH, and in this state, the CRC may be scrambled to the C-RNTI. The DCI format 1_1 in which the CRC is scrambled to the C-RNTI, may include, for example, pieces of information of Table 9 below.

TABLE 9

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL,BWP}/P \rceil$ bits
    For resource allocation type 1, $\lceil \log_2(N_{RB}^{DL,BWP}(N_{RB}^{DL,BWP} + 1)/2) \rceil$ bits
Time domain resource assignment - 1, 2, 3, or 4 bits
VRB-to-PRB mapping - 0 or 1 bit, only for resource allocation type 1.
    0 bit if only resource allocation type 0 is configured:
    1 bit otherwise
PRB bundling size indicator - 0 or 1 bit
Rate matching indicator - 0, 1, or 2 bits
ZP CSI-RS trigger - 0, 1, or 2 bits
For transport block 1:
    Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6 or 8 bits
CBG flushing out information - 0 or 1 bit
DMRS sequence initialization - 1 bit In the NR system, in addition to a frequency domain resource candidate assignment through BWP indication, detailed frequency domain resource allocations (FDRAs) may be provided through the DCI as follows.

Figure 6:
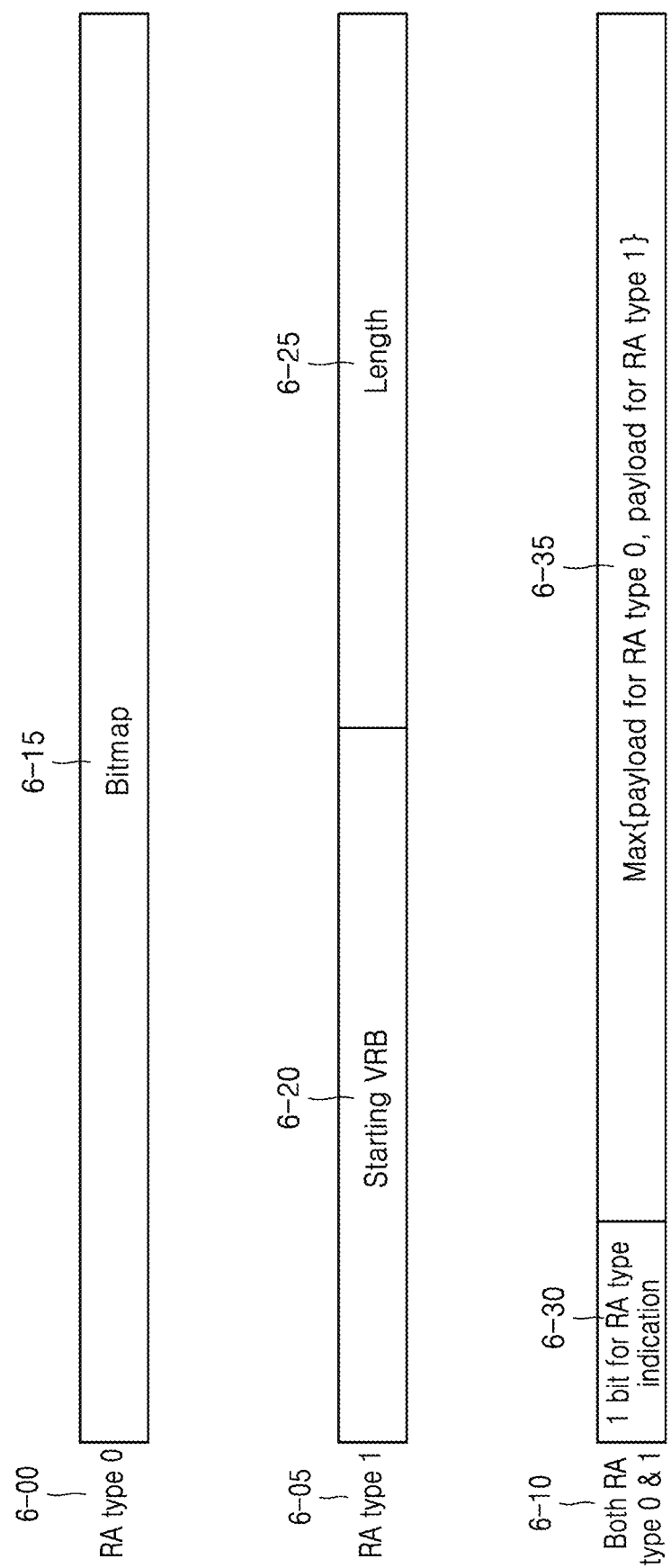
FIG. 6 illustrates physical downlink shared channel (PDSCH) frequency domain resource allocation in a wireless communication system, according to an embodiment of the disclosure.

FIG. 6 illustrates PDSCH frequency domain resource allocation in a wireless communication system, according to an embodiment of the disclosure.

Referring to FIG. 6, when the UE is configured to use a resource type 0 only through the higher layer signaling (6-00), some DCI for assigning the PDSCH to the UE may have a bitmap consisting of NRBG bits. The conditions for the above feature are described later. In this state, the NRBG may mean the number of resource block groups (RBGs) determined as shown in Table 10 below according to a higher layer parameter rbg-Size and the size of a BWP assigned by the indicator, and data is transmitted to an RBG displayed to be 1 by the bitmap.

TABLE 10

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use a resource type 1 only through the higher layer signaling (6-05), some DCI for assigning the PDSCH to the UE may have frequency domain resource allocation information consisting of $\lceil \log_2 (N_{RB}^{DL,BWP}(N_{RB}^{DL,BWP}+1)/2) \rceil$ bits. The base station may configure a starting VRB 6-20 and the length 6-25 of a frequency domain resource continuously assigned therefrom through the above information.

When the UE is configured to use both of the resource type 0 and the resource type 1 through the higher layer signaling (6-10), some DCI for assigning the PDSCH to the UE may have frequency domain resource allocation information consisting of bits of a greater value 6-35 between a payload 6-15 for configuring the resource type 0 and payloads 6-20 and 6-25 for configuring the resource type 1. The conditions for the above feature are described later. In this state, a bit may be added to the foremost part (MSB) of the frequency domain resource allocation information in the DCI, and when the bit is 0, use of the resource type 0 may be indicated, and when the bit is 1, use of the resource type 1 may be indicated.

Figure 7:
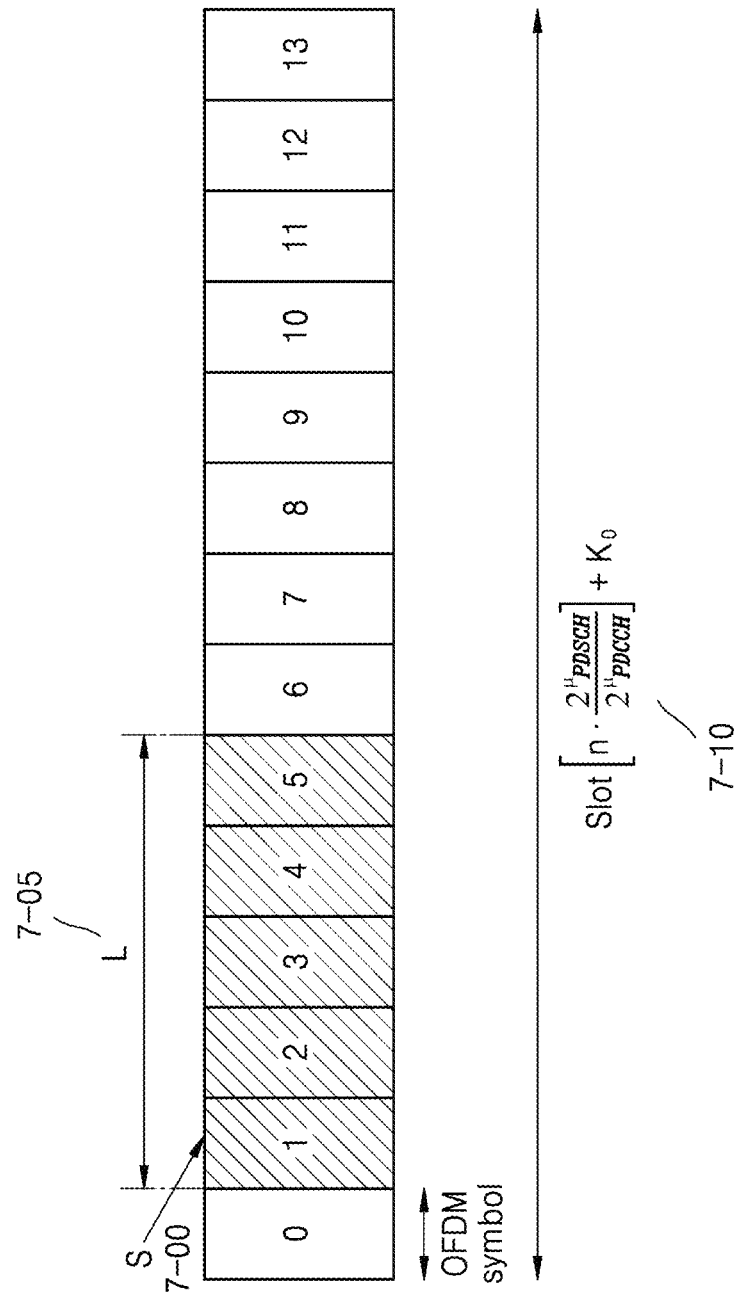
FIG. 7 illustrates PDSCH time domain resource assignment in a wireless communication system, according to an embodiment of the disclosure.

FIG. 7 illustrates PDSCH time domain resource assignment in a wireless communication system, according to an embodiment of the disclosure.

Referring to FIG. 7, the base station may indicate a time axis position of the PDSCH resource according to subcarrier spacings $\mu_{PDSCH}$ and $\mu_{PDCCH}$ of the data channel and the control channel configured through the higher layer, a scheduling offset $K_0$ value, and an OFDM symbol start position 7-00 and a length 7-05 in one slot 7-10 dynamically indicated through the DCI.

Figure 8:
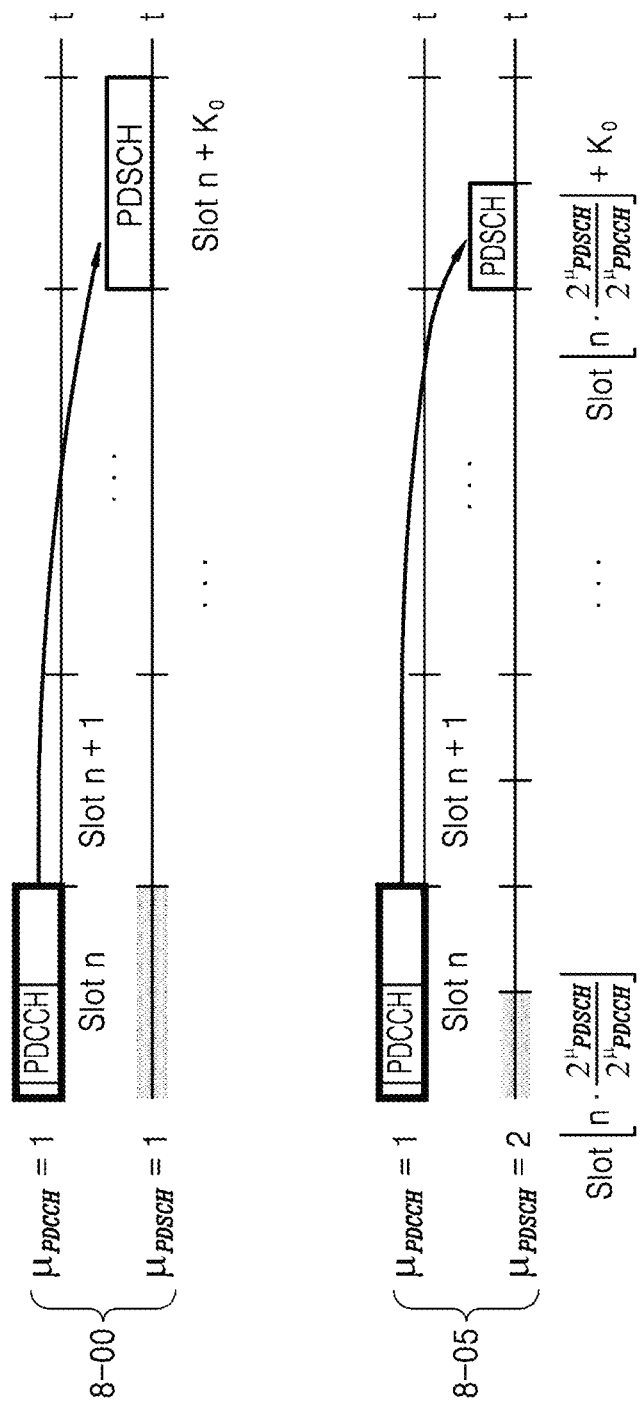
FIG. 8 illustrates PDSCH time domain resource assignment according to a subcarrier spacing of a data channel and a control channel in a wireless communication system, according to an embodiment of the disclosure.

FIG. 8 illustrates PDSCH time domain resource assignment according to the subcarrier spacing of the data channel and the control channel in a wireless communication system, according to an embodiment of the disclosure.

Referring to FIG. 8, when the subcarrier spacings of the data channel and the control channel are the same (8-00, $\mu_{PDSCH}=\mu_{PDCCH}$), as slot numbers for data and control are the same, the base station and the UE may see that a scheduling offset is generated according to a predetermined slot offset $K_0$. In contrast, when the subcarrier spacings of the data channel and the control channel are different from each other (8-05, $\mu_{PDSCH}\neq\mu_{PDCCH}$), as slot numbers for data and control are different from each other, the base station and the UE may see that a scheduling offset is generated according to the predetermined slot offset $K_0$ based on the subcarrier spacing of the PDCCH.

Next, in the NR system, a part of a decoding process on the PDSCH scheduled with the DCI is described in detail.

The UE receive, through the DCI, a modulation and coding scheme (MCS) of the PDSCH with frequency and time resource information assigned for the PDSCH. A MCS field of the DCI indicates an index to one table selected through the higher layer from among below three tables, that is, Table 11, Table 12, and Table 13. During initial transmission and HARQ retransmission, a range of an indicated index may differ, and during initial transmission, indexes 0-28 of Table 11, indexes 0-27 of Table 12, and Indexes 0-28 of Table 13 are used, and during retransmission, indexes 29-31 of Table 11, indexes 28-31 of Table 12, and Indexes 29-31 of Table 13 are used. During the initial transmission, the indicated index may contain modulation order and target code rate information of the transmitted PDSCH, and during the retransmission, the indicated index may contain modulation order information of the transmitted PDSCH.

TABLE 11

MCS Index Table 1 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 12

MCS Index Table 2 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |

TABLE 12-continued

MCS Index Table 2 for PDSCH

| MCS Index $I_{MCS}$ | Modulation Order $Q_m$ | Target code Rate R × [1024] | Spectral efficiency |
|---|---|---|---|
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 13

MCS Index Table 3 for PDSCH

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

For the initial transmission, the UE needs to know the size of a transport block (TB) before the scheduled PDSCH is encoded. To this end, the following steps are performed, and when two TBs are transmitted, the following steps are performed on each code word.

Step 1) The UE calculates a total number of REs assigned for the PDSCH transmission by an equation that $N'_{RE}=N_{sc}^{RB} \cdot N_{symb}^{sh} - N_{oh}^{PRB}$, in one of a slot where the PDSCH is scheduled and a physical resource block (PRB). In an equation to calculate a total RE number assigned for the PDSCH transmission, $N_{sc}^{RB}$ denotes 12 that is the number of subcarriers in one PRB, and $N_{symb}^{sc}$ denotes the number of symbols to which the PDSCH is scheduled in one slot. Furthermore, $N_{DMRS}^{PRB}$ denotes the number of REs assigned for DM-RS in the PRB, which includes overhead indicated in DM-RS CDM groups without data in the DCI. Furthermore, $N_{oh}^{PRB}$ denotes an overhead value indicated through the higher layer. Next, a total RE number to the entire scheduled PRB is calculated by an equation that $N_{RE}=\min(156, N_{RE}) \cdot n_{PRB}$, and in the equation for calculating the total RE number of the entire scheduled PRB, nPRB denotes a total PRB number assigned for the PDSCH transmission to the UE.

Step 2) The intermediate number of information bits in the PDSCH is calculated by an equation that $N_{info}=N_{RE} \cdot R \cdot Q_m \cdot v$, in which R and $Q_m$ denote a target rate and a modulation order respectively indicated by the MCS, and V denotes the number of layers.

Step 3) When the calculated $N_{info}$ value is greater than 3824, the UE determines that a plurality of code blocks are transmittable (Step 5), and otherwise, the UE determines that a single code block is transmitted (Step 4).

Step 4) When the UE determines that a single code block is transmitted, the UE calculates an equation that $$N'_{info} = \max\left(24, 2^n \cdot \left\lfloor \frac{N_{info}}{2^n} \right\rfloor\right),$$

where $n=\max(3, \lfloor \log_2(N_{info}) \rfloor -6)$, and finds the minimum transport block size (TBS) that is not less than $N'_{info}$, in Table 14. The TBS found by the UE is the size of a TB determined by the UE.

Step 5) When the UE determines that a plurality of code blocks are transmittable, the UE performs the next step according to an equation that $$N'_{info} = \max\left(3840, 2^n \times \text{round}\left(\frac{N_{info} - 24}{2^n}\right)\right),$$

where $n=\lfloor \log_2(N_{info}-24) \rfloor -5$, and a target code rate:

Step 5-1) When Target code rate≤¼ and $$TBS = 8 \cdot C \cdot \left\lceil \frac{N'_{info} + 24}{8 \cdot C} \right\rceil - 24,$$

where $$C = \left\lceil \frac{N'_{info} + 24}{3816} \right\rceil,$$

and a calculated TBS denotes the number of code blocks.

Step 5-2) When Target code rate >¼ and $N'_{info}$>8424, $$TBS = 8 \cdot C \cdot \left\lceil \frac{N'_{info} + 24}{8 \cdot C} \right\rceil - 24,$$

where $$C = \left\lceil \frac{N'_{info} + 24}{8424} \right\rceil,$$

and the calculated TBS denotes the number of code blocks. In the opposite case, $$TBS = 8 \cdot \left\lceil \frac{N'_{info} + 24}{8} \right\rceil - 24,$$

and a single code block is transmitted.

TABLE 14

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

In the case of retransmission, the TB size of a retransmitted PDSCH is assumed to be the same as the TB size calculated during the initial transmission.

Figure 9:
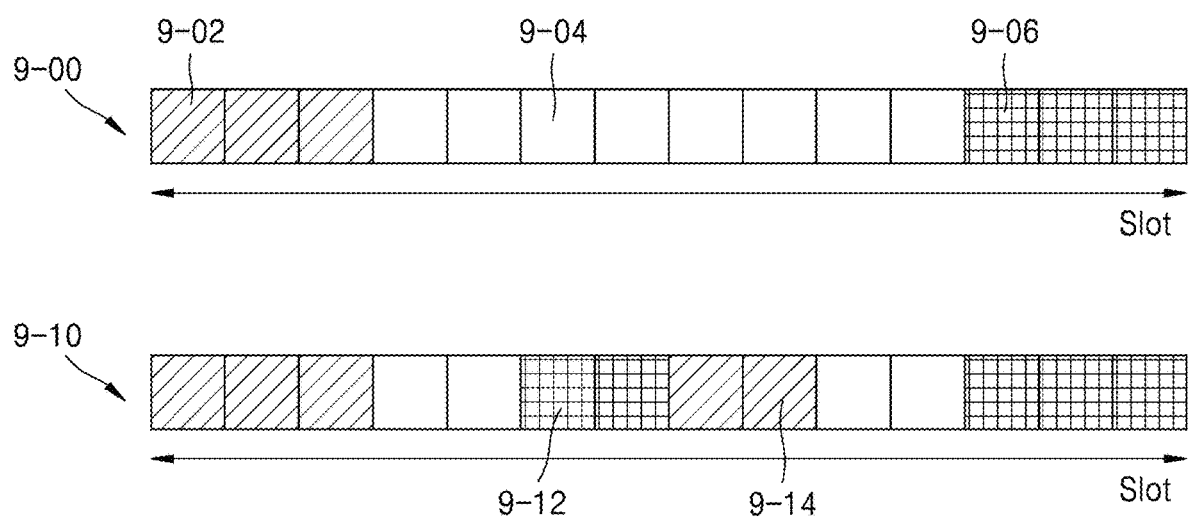
FIG. 9 illustrates a slot format structure in a wireless communication system, according to an embodiment of the disclosure.

FIG. 9 illustrates a slot format structure in a wireless communication system, according to an embodiment of the disclosure.

A Rel-15 NR system provides a frequency division duplexing (FDD) system separately using the DL and UL frequencies and a time division duplexing (TDD) system using the DL and UL frequencies together. In the TDD situation, the UE has to know in advance whether a specific slot or symbol is a DL symbol or a UL symbol, to communicate with the base station. Accordingly, in the NR system, three types of symbol types are provided as follows.

DL symbol
UL symbol
Flexible symbol: a symbol to be used as a DL symbol or a UL symbol The UE may finally determine through the following four steps whether a symbol is a DL symbol, a UL symbol, or a flexible symbol.

Step 1: Common RRC Signaling

A system information block (SIB) commonly informs, to UEs, of a symbol configuration in a slot in each specific slot cycle. The SIB informs the number of DL slots, the number of DL symbols, the number of UL slots, and the number of UL symbols existing in a specific cycle. Slots or symbols that are not indicated to be ULs or DLs are all regarded to be flexible slots or flexible symbols. In the NR system, tdd-UL-DL-ConfigurationCommon is regarded as Step 1 signaling.

Step 2: UE Specific RRC Signaling

In Step 1, the UL symbol or DL symbol information is additionally provided regarding flexible slots or symbols. Regarding the flexible slot or symbols determined in Step 1, in Step 2 as well, slots or symbols having no information about the UL or DL are all regarded by the UE to be flexible slots or symbols. Step 2 may be omitted according to the UE. In other words, the DL symbol or UL symbol determined in Step 1 may not be changed again by Step 2. In the NR system, tdd-UL-DL-ConfigurationDedicated is regarded to be Step 2 signaling.

Step 3: Common L1 Signaling

The UL symbol, the DL symbol, or the flexible symbol are additionally indicated again by a DCI format 2_0 with respect to only the flexible symbols determined in Step 1 or 2. Step 3 may be omitted according to the UE. In other words, the DL symbol or UL symbol determined in Step 1 or 2 may not be changed again by Step 3. In the NR system, the DCI format 2_0 is regarded to be Step 3 signaling.

Step 4: UE Specific L1 Signaling

The UL symbol is determined by a DCI format 0_x for scheduling UL data with respect to the flexible symbol or the UL symbols determined in Step 1, 2, or 3. Alternatively, the DL symbol is determined by the DCI format 1_x for scheduling DL data with respect to the flexible symbol or DL symbols determined in Step 1, 2, or 3. In other words, the UE does not expect the scheduling of the UL data transmission by the DCI format 0_x with respect to the DL symbol determined in Step 1, 2, or 3. In the NR system, the DCI format 1_x or the DCI format 0_x is regarded to be Step 4 signaling.

According to an embodiment of the disclosure, among the above-described steps, Step 3 or Step 4 may be applied in a reverse order. Accordingly, the UE does not expect that the UL symbol indicated in Step 4 is indicated again in Step 3 to be the flexible symbol or the DL symbol. Furthermore, the UE does not expect that the DL symbol indicated in Step 4 is indicated again in Step 3 to be the flexible symbol or the UL symbol. Accordingly, the symbol indicated first in Step 4 is indicated to be exactly the same symbol in Step 3. A situation to which Steps 1 to 3 are applied is shown as an example, in FIG. 9. A DL symbol 9-02, a flexible symbol 9-04, and a UL symbol 9-06 may be configured in one slot, like 9-00, in Step 1 or 2 that is the higher signaling. Then, the UE may dynamically indicate a UL symbol 9-12 and a DL symbol 9-14 in Step 3, only on the flexible symbol link configured in Step 1 or 2 like 9-10.

The next operation is established with respect to the PDSCH scheduled by the DCI format 1_0 or 1_1 or the first SPS PDSCH scheduled by the DCI format 1_0 or 1_1 indicating SPS activation in the Rel-15 NR system.

When the PDSCH scheduled in a single slot for any case in which the common L1 signaling of Step 3 is configured or not configured to be the higher signal, the UE expects not overlapping with the UL symbol configured in Step 1 or 2. In other words, a resource indicated to be the UL symbol by Step 1 or 2 is not present in the time resource domain in which the PDSCH is scheduled.

When the PDSCH that is repeatedly transmitted in a slot cycle for any case in which the common L1 signaling of Step 3 is configured or not configured to be the higher signal, when the UL symbol configured by Step 1 or 2 and the PDSCH transmitted in a specific slot are overlapped with each other, the UE does not expect that the PDSCH is received in the slot. In other words, the receiving of a PDSCH is omitted.

When the common L1 signaling of Step 3 is configured, the UE does not expect that a part of the time resource domain of the scheduled PDSCH is configured to be the UL symbol by Step 3. In other words, the UE expects that the PDSCH is scheduled with respect to the time resource domain configured with another symbol, not the UL symbol by Step 3.

When the common L1 signaling of Step 3 is configured, the UE does not expect that a part of the time resource domain of the SPS PDSCH that is first transmitted by the activation DCI indicating SPS PDSCH is configured by Step 3 to be the UL or flexible link. In other words, the UE expects that the first SPS PDSCH is scheduled only for the time resource domain configured by Step 3 to be the DL.

The next operation is established for the other SPS PDSCHs except the first SPS PDSCH scheduled by the DCI format 1_0 or 1_1 indicating the SPS activation in the Rel-15 NR system.

When the common L1 signaling of Step 3 is not configured and a part of the resource domain of the SPS PDSCH that is repeatedly transmitted and received in a slot cycle is configured by Step 1 or 2 to be the UL symbol, the UE does not expect receiving of the SPS PDSCH, and the base station does not transmit the SPS PDSCH.

When the common L1 signaling of Step 3 is configured and the UE correctly receives the common L1 signaling of Step 3, and the part of the resource domain of the SPS PDSCH that is repeatedly transmitted and received in a slot cycle is overlapped with the UL symbol or flexible symbol indicated by the common L1 signaling, the UE does not expect receiving the SPS PDSCH in the slot, and the base station does not transmit the SPS PDSCH. In detail, when the base station transmits the common L1 signaling of Step 3, the UE may need a time to receive and determine slot information time, which is assumed to be N2. The operation may be employed when determining the transmitting and receiving of the SPS PDSCH at a time point when N2 passes after receiving the common L1 signaling of Step 3.

When the common L1 signaling of Step 3 is configured and the UE does not correctly receive the common L1 signaling, and the part of the resource domain of the SPS PDSCH that is repeatedly transmitted and received in a slot cycle is overlapped with the UL symbol or the flexible symbol indicated by Step 1 or 2, the UE does not expect receiving of the SPS PDSCH in the slot. In detail, aside from a situation when the UE does not correctly receive the common L1 signaling of Step 3, when the base station transmits the common L1 signaling of Step 3, the UE may need a time to receive and determine slot information time, which is assumed to be N2. The operation may be employed when determining the receiving of the SPS PDSCH and determining the transmitting and receiving of the SPS PDSCH before N2.

In the disclosure, a detailed meaning of describing that the UE does not expect a specific situation is regarded such that, when a specific situation is generated, the UE regards this to be an error case. Furthermore, in terms of the base station, it may mean that scheduling is performed not to generate a situation that the UE does not expect.

Figure 10:
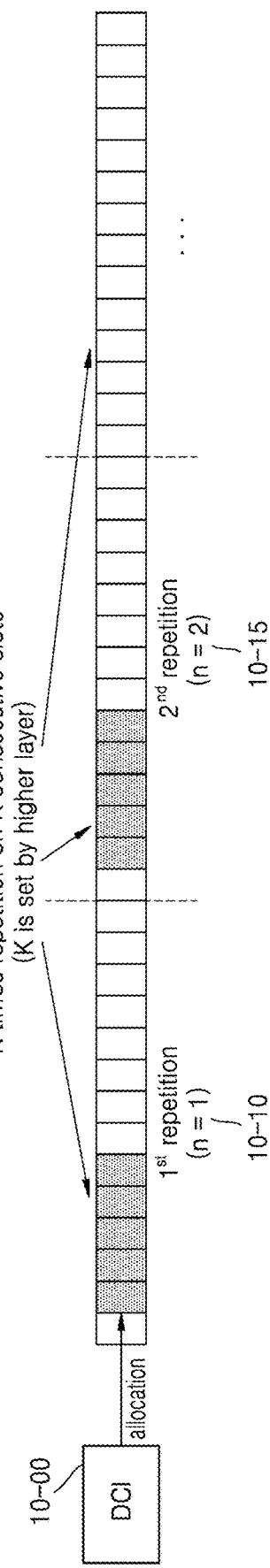
FIG. 10 illustrates repeated transmission per slot (slot aggregation) in a wireless communication system, according to an embodiment of the disclosure.

FIG. 10 illustrates repeated transmission per slot (slot aggregation) in a wireless communication system, according to an embodiment of the disclosure.

Referring to FIG. 10, in the NR system, for improvement of UE's PDSCH receiving reliability, repeated transmission of the same PDSCH is supported (10-00). The base station may configure the repeated transmission frequency of a PDSCH, for example, pdsch-AggregationFactor in PDSCH-Config, to the higher layer such as RRC, and when the repeated transmission frequency is configured, the PDSCH scheduled to the DCI may be repeatedly transmitted in the same number of slots as the consecutive repeated transmission frequencies (10-05). All PDSCHs that are repeatedly transmitted may be assigned with the same time resource in a slot, which may be, as illustrated in FIG. 7, the OFDM symbol start position 7-00 and the length 7-05 in one slot indicated by the DCI. Furthermore, it may be assumed that the same TB may be transmitted to all PDSCHs that are repeatedly transmitted. The UE may expect that the PDSCHs that are repeatedly transmitted may be transmitted through a single layer only. Furthermore, a redundancy version (RV) of the PDSCHs that are repeatedly transmitted may be determined according to the index of the PDSCHs that are repeatedly transmitted and an RV value indicated by the DCI for scheduling the PDSCH, as shown in Table 15 below.

TABLE 15

| $rv_{id}$ indicated by the DCI scheduling the PDSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In Table 15, n may denote an index of each PDSCH in the repeated transmission frequency determined to be the higher layer (10-10) and (10-15).

Referring to the descriptions about the above-described DCI structure, the PDSCH time/frequency resource assignment, and the PDSCH transmission and receiving process performed based on the above, in the release 15, the NR system uses a single transmission point/panel/beam only during the repeated transmission of PDSCH. When cooperative communication using multiple transmission points/panels/beams is employed applied during the repeated transmission of PDSCH, more robust performance to channel blockage or the like may be obtained, and thus in the NR release 16, repeated transmission technique through multiple transmission points/panels/beams is actively discussed. At this moment, for the improvement of UE's receiving reliability, combining of a transmission signal for each transmission reception point (TRP)/beam is necessary.

An embodiment of the disclosure is described in detail with the accompanying drawings. Furthermore, in the description of the disclosure, when detailed descriptions about related well-known functions or structures are determined to make the gist of the disclosure unclear, the detailed descriptions will be omitted herein The terms used in the disclosure have been selected from currently widely used general terms in consideration of the functions in the disclosure. However, the terms may vary according to the intention of one of ordinary skill in the art, case precedents, and the advent of new technologies. Accordingly, the terms used in the disclosure are defined based on their meanings in relation to the contents discussed throughout the specification, not by their simple meanings.

The base station is a subject performing resource assignment of a UE and may be at least one of nodes on gNode B, eNode B, Node B, a base station (BS), a wireless connection unit, a base station controller, or a network. The UE may include a user equipment (UE), a mobile station (MS), a cellular phone, a smartphone, a computer, a multimedia system capable of performing a communication function, or the like. Furthermore, although the embodiment of the disclosure is described with an example of the NR or LTE/LTE-A system, the embodiment of the disclosure may be applied to other communication systems having a similar technical background or channel form. Furthermore, the embodiment of the disclosure may be applied to other communication systems through some modifications within the scope of the disclosure according to the judgment of a person with skilled technical knowledge.

The contents of the disclosure may be applied to a FDD and TDD system.

In the disclosure, the higher signaling (or higher signal) is a signal transmission method of transmitting from the base station to the UE by using a DL data channel of a physical layer, or from the UE to the base station by using a UL data channel of a physical layer, and may be referred to as RRC signaling, PDCP signaling, or MAC CE.

In the disclosure, a L1 signal, which is a type of a signal transmitted by the base station to the UE in a physical layer stage, may be interpreted to be a specific field in DCI, a DCI format, RNTI scrambled in a CRC of DCI, or CORESET or search space through which DCI is transmitted. Accordingly, being classified as a L1 signal may mean classification through the above examples.

In the disclosure, in determining of whether cooperative communication is applied, the UE may use various methods in which a PDCCH(s) assigning a PDSCH to which cooperative communication is applied has a specific format, a PDCCH(s) assigning a PDSCH to which cooperative communication is applied includes a specific indicator informing whether the cooperative communication is applied, a PDCCH(s) assigning a PDSCH to which cooperative communication is applied is scrambled to a specific RNTI, application of cooperative communication is assumed in a specific section indicated to be the higher layer, or the like. Then, for convenience of explanation, the UE receiving the PDSCH to which cooperative communication is applied based on the above similar conditions may be referred to as a non-coherent joint transmission (NC-JT) case.

In the disclosure, determining the order of priority between A and B may be variously referred to as selecting a higher order of priority according to the predetermined order of priority rule and performing an operation corresponding thereto or omitting or dropping an operation corresponding to having a lower order of priority. The disclosure is not limited to the above example.

In the disclosure, although the examples are described through a plurality of embodiments, the examples are not independent and one or more embodiments may be simultaneously or compositely employed.

The 5G wireless communication system may support not only a service requiring a high transmission rate, but also a service having a very short transmission delay and a service requiring a high connection density. In a wireless communication network including a plurality of cells, a TRP, or a beam, cooperative communication (coordinated transmission) between the respective each cell, a TRP, or/and a beam is one of elementary technologies satisfying various service requirements by increasing the strength of a signal received by the UE or efficiently performing interference control among each cell, a TRP, or/and a beam.

Joint transmission (JT) is a representative transmission technology for the above-described cooperative communication and may increase the strength of a signal received by the UE by supporting one UE via a different cell, a TRP or/and beam through joint transmission technology. As the characteristics of a channel between each cell, a TRP, or/and a beam and the UE may be greatly different from each other, a different precoding, MCS, or resource assignment may be applied to a link between each cell, a TRP, or/and a beam and the UE In particular, for non-coherent joint transmission (NC-JT) supporting non-coherent precoding among each cell, a TRP, or/and a beam, an individual DL transmission information configuration for each cell, a TRP, or/and a beam is important. The individual DL transmission information configuration for each cell, a TRP, or/and a beam is a main factor to increase a payload needed for DL DCI transmission, which may have a bad influence on the receiving performance of a PDCCH for transmitting DCI. Accordingly, tradeoff between DCI information amount and the PDCCH receiving performance for JT support needs to be carefully designed.

Figure 11:
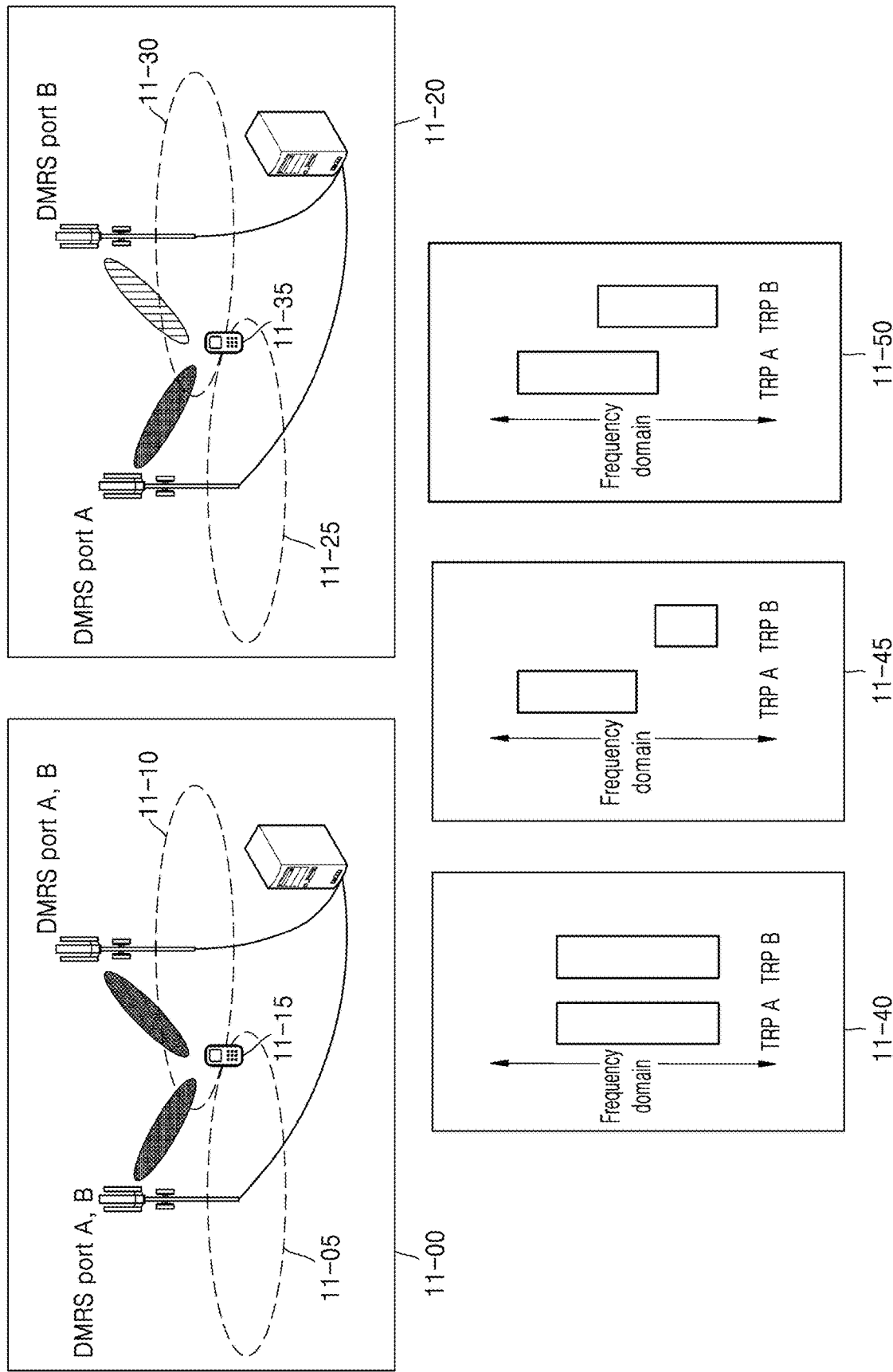
FIG. 11 illustrates an antenna port configuration and resource assignment for cooperative communication in a wireless communication system, according to an embodiment of the disclosure.

FIG. 11 illustrates an antenna port configuration and resource assignment for cooperative communication in a wireless communication system, according to an embodiment of the disclosure.

Referring to FIG. 11, examples of JT technique and wireless resource assignment for a TRP according to a situation are illustrated. In FIG. 11, 11-00 denotes an example of coherent joint transmission (C-JT) supporting coherent precoding among each cell, a TRP, or/and a beam. In the C-JT, at a TRP A 11-05 and a TRP B 11-10, single data (PDSCH) is transmitted to a UE 11-15, and joint precoding is performed at a plurality of TRPs. The same DMRS ports, for example, DMRS port A and B at both TRPs, for receiving the same PDSCH are transmitted at the TRP A 11-05 and the TRP B 11-10. In this case, the UE may receive one piece of DCI information for receiving one PDSCH demodulated by the DMRS ports A and B.

In FIG. 11, 11-20 denotes an example of the NC-JT supporting non-coherent precoding among each cell, a TRP, or/and a beam. For the NC-JT, a PDSCH is transmitted to a UE 11-35 for each of each cell, a TRP, or/and a beam, individual precoding may be applied to each PDSCH. Each cell, a TRP, or/and a beam may transmit a different PDSCH to improve a processing rate compared with the transmission of a single cell, a TRP, or/and a beam, or each cell, a TRP, or/and a beam may repeatedly transmit the same PDSCH to improve reliability compared with the transmission of a single cell, a TRP, or/and a beam.

Various wireless resource assignments may be considered, for example, when frequency and time resources used at a plurality of TRPs for PDSCH transmission are all the same (11-40), when frequency and time resources used at a plurality of TRPs are not overlapped with each other (11-45), or when some of frequency and time resources used at a plurality of TRPs are overlapped with each other (11-50). In each case of the above-described wireless resource assignments, when the same PDSCH are repeatedly transmitted at a plurality of TRPs for the improvement of reliability, a receiving UE, when not knowing whether the PDSCH is repeatedly transmitted, may not perform combining in a physical layer on the PDSCH so that there may be a limitation in the improvement of reliability. Thus, in the disclosure, a method of indicating and configuring repeated transmission for NC-JT transmission reliability improvement.

DCIs of various forms, structures and relations may be considered to simultaneously assign a plurality of PDSCHs to one UE for NC-JT support.

Figure 12:
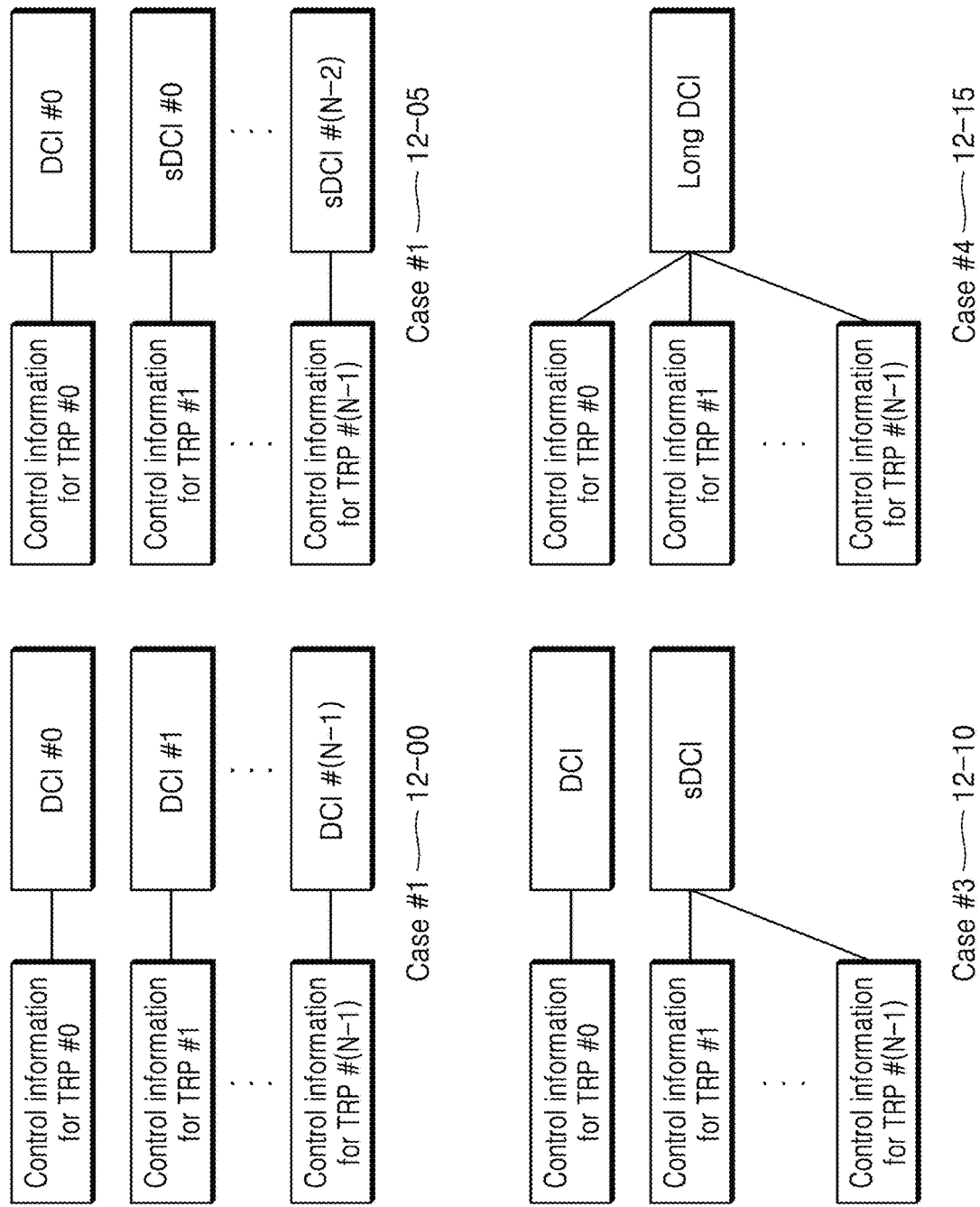
FIG. 12 illustrates a downlink control information (DCI) configuration for cooperative communication in a wireless communication system, according to an embodiment of the disclosure.

FIG. 12 illustrates a DCI configuration for cooperative communication in a wireless communication system, according to an embodiment of the disclosure. Referring to FIG. 12, four examples of a DCI design for the NC-JT support are illustrated.

In FIG. 12, a case #1 12-00 is an example, in which, when (N−1) PDSCHs different from each other are transmitted at (N−1) additional TRPs TRP #1-TRP #(N−1) other than a serving TRP TRP #0 used for the transmission of a single PDSCH, control information about a PDSCH transmitted at the (N−1) additional TRPs is transmitted in the same form (same DCI format) as control information about a PDSCH transmitted at the serving TRP. In other words, the UE may obtain control information about PDSCHs transmitted at different TRPs TRP #0-TRP #(N−1) through DCIs DCI #0-DCI #(N−1) having the same DCI format and the same payload. In the above-described case #1, although a degree of freedom of each PDSCH control (assignment) may be completely guaranteed, when each DCI is transmitted at a different TRP, a coverage difference for each DCI is generated so that the receiving performance may deteriorate.

In FIG. 12, a case #2 12-05 is an example, in which, when the (N−1) PDSCHs different from each other are transmitted at the (N−1) additional TRPs TRP #1-TRP #(N−1) other than the serving TRP TRP #O used for the transmission of a single PDSCH, the control information about a PDSCH transmitted at the (N−1) additional TRPs is transmitted in a different form (different DCI format or different DCI payload) from the control information about a PDSCH transmitted at the serving TRP. For example, the DCI #0 that transmits the control information about a PDSCH transmitted at the serving TRP TRP #0 may include all information elements of the DCI formats 1_0 to 1_1, "shortened" DCIs sDCI #0-sDCI #(N−2) that transmit control information about PDSCHs transmitted at the cooperative TRPs TRP #1-TRP #(N−1) may include some of information elements of the DCI formats 1_0 to 1_1. According to an embodiment of the disclosure, information that is not included in the shortened DCI (sDCI) may follow the DCI of the serving TRP, that is, DCI #0, normal DCI, or nDCI.

Accordingly, the control information about PDSCHs transmitted at the cooperative TRP may have a less payload compared with a normal DCI (nDCI) that transmits the control information about a PDSCH transmitted at the serving TRP, or include reserved bits as many as the number of bits that are missing compared with the nDCI. In the above-described case #2, according to the contents of information element included in the sDCI a degree of freedom of each PDSCH control (assignment) may be restricted, but the receiving performance of the sDCI is superior to the nDCI so that the probability of a coverage difference for each DCI may be lowered.

In FIG. 12, a case #3 12-10 is another example, in which, when the (N−1) PDSCHs different from each other are transmitted at the (N−1) additional TRPs TRP #1-TRP #(N−1) other than the serving TRP TRP #0 used for the transmission of a single PDSCH, the control information about a PDSCH transmitted at the (N−1) additional TRPs is transmitted in a different form (different DCI format or different DCI payload) from the control information about a PDSCH transmitted at the serving TRP. For example, the DCI #0 that transmits the control information about a PDSCH transmitted at the serving TRP TRP #0 may include all information elements of the DCI formats 1_0 to 1_1, and for the control information about PDSCHs transmitted at the cooperative TRPs TRP #1-TRP #(N−1), it may be possible to gather and transmit only some of the information elements of the DCI formats 1_0 to 1_1 in one "secondary" DCI (sDCI). For example, the sDCI may include at least one piece of information among HARQ related information such as frequency domain resource allocation, time domain resource assignment, or MCS of cooperative TRPs. According to an embodiment of the disclosure, in addition, information such as a BWP indicator or a carrier indicator, which is not included in the sDCI, may follow the DCI (DCI #0, normal DCI, nDCI) of the serving TRP.

In the case #3, a degree of freedom of each PDSCH control (assignment) may be restricted according to the contents of the information elements included in the sDCI, but receiving performance adjustment of the sDCI may be possible and compared with the case #1 or #2, the complexity of DCI blind decoding of the UE may be reduced.

In FIG. 12, a case #4 12-15 is an example, in which, when the (N−1) PDSCHs different from each other are transmitted at the (N−1) additional TRPs TRP #1-TRP #(N−1) other than the serving TRP TRP #O used for the transmission of a single PDSCH, the control information about a PDSCH transmitted at the (N−1) additional TRPs is transmitted in the same DCI as the control information about a PDSCH transmitted at the serving TRP. In other words, the UE may obtain the control information about PDSCHs transmitted at different TRPs TRP #0-TRP #(N−1) through a single DCI. In the case #4, the complexity of the DCI blind decoding of the UE may not increase, but a degree of freedom of the PDSCH control (assignment) may be reduced, and thus. For example, the number of cooperative TRPs are restricted according to the limitation of a long DCI payload.

In the following descriptions and embodiments, the sDCI may be referred to as various auxiliary DCIs such as the shortened DCI, the secondary DCI, or the normal DCI (the above-described DCI format 1_0 to 1_1) including PDSCH control information transmitted at the cooperative TRP, and unless special restrictions are specified, the description is similarly applicable to the various auxiliary DCIs. Furthermore, the name of each DCI is an example, and the disclosure is not limited thereto.

In the following descriptions and embodiments, the above-described cases #1, #2, and #3, in which one or more DCIs (PDCCHs) are used for the NC-JT support, may be classified into a multiple PDCCH based NC-JT, and the above-described case #4, in which a single DCI (PDCCH) is used for the NC-JT support, may be classified into a single PDCCH based NC-JT.

In the embodiments of the disclosure, the "cooperative TRP", when actually applied, may be replaced with various terms such as "cooperative panel" or "cooperative beam".

In the embodiments of the disclosure, "when the NC-JT is applied" may be variously interpreted according to a situation, for example, "when the UE simultaneously receives one or more PDSCHs in one BWP", "when the UE receives a PDSCH based on simultaneously two or more TCIs in one BWP", or "when a PDSCH received by the UE is associated with one or more DMRS port groups", but is used with one expression for convenience of explanation.

In the disclosure, a wireless protocol structure for NC-JT may be variously used according to a TRP deployment scenario. For example, when there is no or little backhaul delay between the cooperative TRPs, a structure based on MAC layer multiplexing may be used (CA-like method). In contrast, when the backhaul delay between the cooperative TRPs is unignorably great (for example, when a time of 2 ms or more is needed for CSI exchange between the cooperative TRPs or scheduling information exchange), delay-resistant characteristics may be obtained by using an independent structure for each TRP from an RLC layer (DC-like method).

In the present embodiment, as described in the above-described first embodiment, a detailed configuration and indication method of repeatedly transmitting a PDSCH in which two or more TRPs are same, to the same transmission band, for example, a transmission band, a component carrier, or a BWP, is provided.

Figure 13:
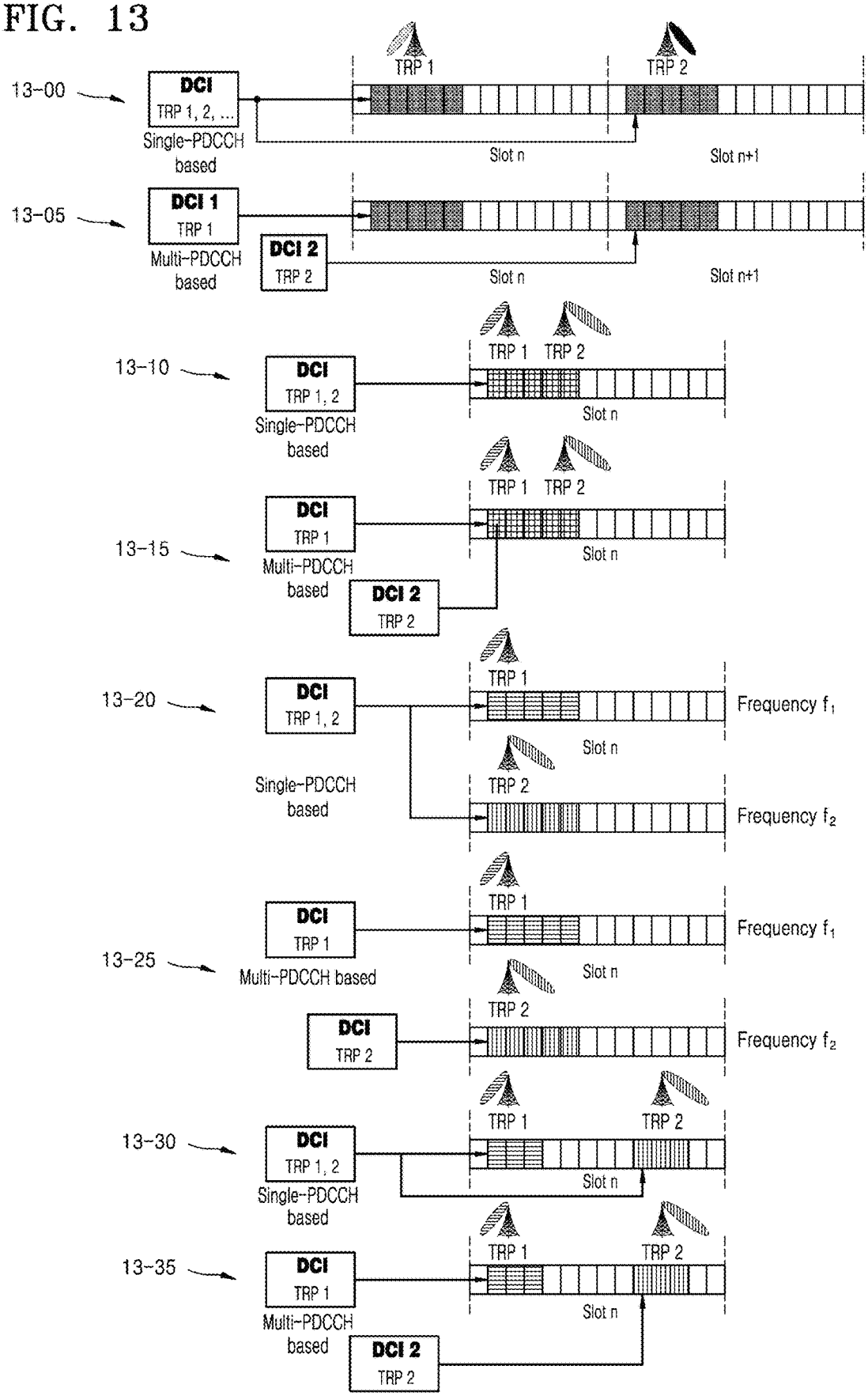
FIG. 13 illustrates repeated transmission of multiple transmission and reception points (TRPs) employing various resource assignment methods in a wireless communication system, according to an embodiment of the disclosure.

FIG. 13 illustrates repeated transmission of a plurality of TRPs employing various resource assignment methods in a wireless communication system, according to an embodiment of the disclosure. Referring to FIG. 13, an example, in which two or more TRPs repeatedly transmit the same PDSCH is illustrated.

In the current Rel-15 NR system, as described above, when the same PDSCH is repeatedly transmitted, slots as many as the repeated transmission frequency are necessary, and for each repeated transmission, the same cell, TRP, and/or beam is used. In contrast, through the discloser embodiment, as a different TRP is sued for each repeated transmission in each slot, higher reliability may be obtained (13-00 and 13-05). A different repeated transmission method may be used according to UE's capability and delay time requirements, an available resource state between TRPs, or the like. For example, when the UE has a capability of receiving the NC-JT, as each TRP uses a method of transmitting the same PDSCH to the same time and frequency resource, a frequency resource use rate may be increased and a delay time needed for PDSCH decoding may be reduced (13-10 and 13-15). The method is efficient when interference between beams is little because beams between TRPs to be simultaneously transmitted are close to be orthogonal. In another example, each TRP may use a method of transmitting the same PDSCH to the same time and not overlapping frequency resource (13-20 and 13-25). The method is efficient when interference between beams of TRPs to be simultaneously transmitted is large and the available frequency resource of each TRP is large. In another example, each TRP may use a method of transmitting the same PDSCH to different OFDM symbols in the same slot (13-30 and 13-35). The method is efficient when the available frequency resource of each TRP is not large and a transmission data size is small. In addition to the above-described methods, a modification based on the above-described methods may be possible.

In the above-described methods, a single DCI may be user to schedule repeated transmission (13-00, 13-10, 13-20, and 13-30), and the DCI may indicate a list of all TRPs to participate in the repeated transmission. A list of TRPs to be repeated transmitted may be indicated in the form of a TCI state list, and the length of the TCI state list may be dynamically changed. The DCI may be repeatedly transmitted for the improvement of reliability, and during the repeated transmission, different beams may be applied for each DCI. Alternatively, multiple DCIs may be used to schedule repeated transmission (13-05, 13-15, 13-25, and 13-35), and each DCI may correspond to the PDSCHs of different TRPs to participate in the repeated transmission. The TRP for each DCI may be indicated in the form of TCI state or a resource used for the repeated transmission, and a detailed description thereof is described in the below-described embodiment. Alternatively, the shortened DCI may be used to schedule the repeated transmission, and each of the normal DCI and the secondary DCI may correspond to the PDSCHs of different TRPs to participate in the repeated transmission. The above-described indication method may be commonly applied to the repeated transmission through a plurality of TRPs and different data transmissions through a plurality of TRPs.

Embodiment

Figure 14:
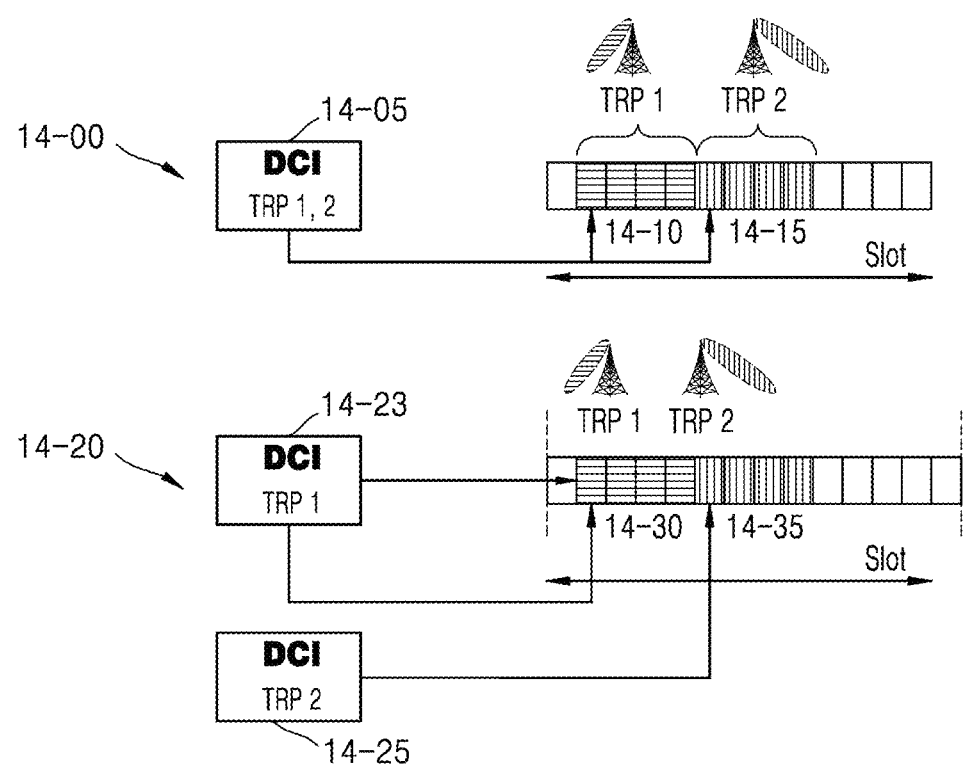
FIG. 14 illustrates a PDSCH repeated transmission method using a plurality of TRPs in a wireless communication system, according to an embodiment of the disclosure.

FIG. 14 illustrates a PDSCH repeated transmission method using a plurality of TRPs in a wireless communication system, according to an embodiment of the disclosure.

A single DCI embodiment 14-00 of FIG. 14 shows an example, in which the base station repeatedly transmits the same PDSCH from different TRPs by using single DCI 14-05. A TRP 1 transmits a PDSCH 14-10 to the UE by using first four OFDM symbols, and a TRP 2 repeatedly transits the same PDSCH 14-15 to the UE by using the next four OFDM symbols. After receiving the two PDSCHs, the UE may improve receiving reliability through combining. The DCI may be transmitted from the TRP 1 or TRP 2 to the UE, and as described in FIG. 13, information that the PDSCH is repeatedly transmitted through different TRPs may be included in the DCI information. The repeated transmission of the same PDSCH of the single DCI embodiment 14-00 of FIG. 14 is merely exemplary, and it is possible to perform the PDSCH repeated transmission by using a different OFDM symbol in one slot or different slots. Furthermore, it is possible to transmit one PDSCH over different slots.

The repeated transmission of the same PDSCH based on multiple TRPs of the single DCI embodiment 14-00 may support the repeated transmission in the form of having a slot based same symbol as described in FIG. 10 or the repeated transmission in the form of having different symbols in a slot (or between slots) as described in FIGS. 13 and 14, and the function may be selected by the higher signal or the L1 signal. A method of indicating repeated transmission in a single DCI is at least one of the followings.

Repeated transmission frequency: A repeated transmission frequency is included in a DCI field. A time domain resource assignment (TDRA) field of the DCI informs a start symbol and length of a PDSCH in a slot one, and the repeated transmission frequency informs the frequency of the additional transmission of the PDSCH. In another example, it is possible to include the repeated transmission frequency field in a TDRA table as an additional row, not as a separate being. Table 16 shows an example.

TABLE 16

| Index | K₀ (Slot offset) | SLIV | PDSCH mapping type | Repetition Number |
|---|---|---|---|---|
| 1 | | | | |
| 2 | | | | |
| ... | | | | |

TCI state number: In FIGS. 13 and 14, as described, the UE may be able to configure one or more TCI state sets to be higher signals (MAC CE) in advance to transmit and receive a plurality of TRPs and data. Accordingly, the size of a TCI state set (that is, the TCI state number) is a PDSCH repeated transmission frequency. In detail, the number of the repeated transmission frequency of PDSCH scheduled to a non-fallback DCI format 1_x may be the same as the TCI state number. The number of the repeated transmission of a PDSCH scheduled to a fallback DCI format 1_0 is 1. In other words, it is a single transmission, not a repeated transmission. In another example, it is possible that the number of PDSCH repeated transmissions is a multiple value of the TCI state number (that is, a TCI state multiplied by X, where X is a natural number). In the situation, the X value may be determined by the higher signal or the L1 signal.

A multiple DCI embodiment 14-20 of FIG. 14 shows an example, in which the UE receives multiple DCIs and repeatedly receives the same PDSCH from different TRPs. In detail, the UE is scheduled for a PDSCH 14-30 consisting of four OFDM symbols through DCI 14-23 received through a TRP 1, and then to a PDSCH 14-35 consisting of four OFDM symbols through DCI 14-25 received from a TRP 2. Although the two PDSCHs are respectively scheduled by different DCIs, they have the same TB. The disclosure is not limited thereto, and a situation in which the two PDSCHs have different TBs may be considered. After the UE receives two PDSCHs, when they are the same TB, receiving reliability may be improved through combining. Unlike the PDSCH repeated transmission by the single DCI based multiple TRPs, in FIG. 14, the TRP where the DCI is transmitted and received and the TRP where the scheduled PDSCH is transmitted and received by the DCI are assumed to be the same TRP. For reference, a method of determining whether the respectively scheduled PDSCHs 14-30 and 14-35 have the same TB or different TBs in the different DCIs 14-23 and 14-25 is shown below.

When the two DCIs have the same HARQ process number and NDI value, two PDSCHs have the same TB. When at least one of the two has a different value, two PDSCHs may have different TBs from each other. The HARQ process number and NDI are merely exemplary, and, like the other time resource assignment field or frequency resource assignment field, in FIG. 5, the above-described DCI fields may be replaced for application. For example, when the time and frequency resource domains of the scheduled PDSCHs in the two DCIs are entirely or at least partially overlapped with each other, the UE may determine that the TB scheduled in the two DCIs are the same. Alternatively, when values of Counter DAI or Total DAI are the same in the two DCIs, the scheduled PDSCHs in the two DCIs may include the same TB. The above determination condition may be always specified in the standard or activated/deactivated by the higher signal configuration.

In a situation where the slot based repeated transmission is previously configured by the higher signal, when the UE receives the same two DCIs having the same HARQ process number and NDI value, the UE regards that a PDSCH repeated transmission is performed in a slot and a transmission pattern in the slot is repeatedly transmitted again in a slot cycle. In an example, in the multiple DCI embodiment 14-20 of FIG. 14, when the UE is previously configured with slot cycle repeated transmission by the higher signal, and the number of slots that are repeatedly transmitted is 2, the UE regards that the PDSCH 14-30 and the PDSCH 14-35 transmitted and received in one slot are transmitted and received in the next slot in exactly the same symbol pattern.

The repeated transmission of the same PDSCH of the multiple DCI embodiment 14-20 is merely exemplary, and it may be possible that the PDSCH repeated transmission is performed by using different OFDM symbols in one slot or different slots. Furthermore, it may be possible that one PDSCH is transmitted over different slots. The multiple DCI based multiple TRPs based repeated transmission of the same PDSCH may support the repeated transmission in the form of having different symbols in a slot (or between slots) as described in FIGS. 13 and 14, and the function may be selected by the higher signal or the L1 signal.

In FIG. 14, the PDSCHs that are repeatedly transmitted by a single DCI or multiple DCIs are assumed to be TDD or FDD both consisting of DL symbols in one slot, and are illustrated like the single DCI embodiment 14-00 or the multiple DCI embodiment 14-20. However, when the UL symbol or flexible symbol link exists in the TDD, the UE may perform a PDSCH repeated transmission other than the embodiment 14-00 or 14-20. Accordingly, a PDSCH repeated transmitting and receiving operation is described according to a situation in which a TDD configuration is configured by the higher signal as in Step 1 or 2 and a situation in which a TDD configuration is indicated to be the UE common signaling configured by Step 3, as described above in FIG. 9. Step 1, Step 2, Step 3, and Step 4 described below follow the concept defined in FIG. 9. The UE performs at least one of the following operations. Furthermore, it may be possible that the UE performs all operations or a combination of some operations thereof. The PDSCH repeated transmission described below is scheduled by the DCI format 1_x, and the repeated transmission means repeated transmission in a slot cycle or in a cycle of a subslot in a slot. A subslot size may be previously configured by the higher signal or determined by the L1 signal, for example, a value L by a SLIV value in the time resource assignment field of the DCI field.

Operation 1: For both of a situation that is under the configuration of Step 3 and a situation that is not under the configuration of Step 3, the UE does not expect that the symbols scheduled to the PDSCH repeated transmission are indicated to be the UL by Step 1 or 2.

Operation 2: For both of a situation that is under the configuration of Step 3 and a situation that is not under the configuration of Step 3, the UE does not expect symbols transmitting the first PDSCH among the symbols scheduled to the PDSCH repeated transmission to be indicated to be the UL by Step 1 or 2, and when at least one symbol of the symbols transmitting the other PDSCHs except the first PDSCH is indicated to be the UL by Step 1 or 2, the UE receives a PDSCH with respect to the other symbols except the symbol indicated to be the UL. For example, one of the other PDSCHs is scheduled to symbols #5-#8 in one slot, and when the symbol #8 among them is configured by Step 1 or 2 to be the UL symbol, the UE receives the PDSCH in the symbols #5-#7. In this state, data transmitted to the PDSCH is rate-matched to the symbols #5-#7 and transmitted from the base station to the UE, or after data transmitted to the PDSCH is rate-matched to the symbols #5-#8, puncturing is performed on the symbol #8, and actual PDSCH transmitting and receiving is performed on the symbols #5-#7. In this state, when an actual valid code rate of the PDSCHs that are repeatedly transmitted exceeds 0.95 or 0.932, the PDSCH transmitting and receiving is not performed, and the UE does not receive the PDSCH.

Operation 3: For both of a situation that is under the configuration of Step 3 and a situation that is not under the configuration of Step 3, the UE does not expect that symbols transmitting the first PDSCH of the symbols scheduled to the PDSCH repeated transmission is indicated to be the UL by Step 1 or 2, and when at least one symbol of the symbols transmitting the other PDSCHs except the first PDSCH is indicated to be the UL by Step 1 or 2, the UE does not perform receiving the PDSCH. In other words, the base station does not perform transmitting the PDSCH. In an example, when a total of three PDSCHs are repeatedly transmitted, which are sequentially referred to as PDSCH 1, PDSCH 2, and PDSCH 3, the UE does not expect that symbols scheduled to PDSCH 1 is indicated to be the UL by Step 1 or 2. In contrast, although symbols schedule to PDSCH 2 or PDSCH 3 may be indicated to be the UL symbols by Step 1 or 2, when one of the symbols of PDSCH 2 is indicated to be the UL symbol by Step 1 or 2, the UE does not expect receiving the PDSCH. When all symbols of PDSCH 3 are not indicated to be the UL symbol by Step 1 or 2, the UE receives the PDSCH.

Operation 4: When the configuration of Step 3 is received and the signaling (DCI format 2_0) is correctly received, the UE does not expect that symbols scheduled to the PDSCH repeated transmission are indicated to be the UL symbols by Step 3.

Operation 5: When the configuration of Step 3 is received and the signaling (DCI format 2_0) is correctly received, the UE does not expect that the symbols assigned to be the first PDSCH among the PDSCHs that are PDSCH repeated transmitted and received are indicated to be the UL symbols by Step 3, and when at least one of the symbols assigned to be other PDSCHs other than the first PDSCH is indicated to be the UL (or flexible symbol) by Step 3, the UE receives the PDSCH with respect to the other symbols except a symbol indicated to be the UL (or flexible link). For example, one of the other PDSCHs is scheduled to the symbols #5-#8 in one slot, and among them, when the symbol #8 is configured to be the UL (or flexible symbol) by Step 3, the UE receives the PDSCH in the symbols #5-#7. In this state, the data transmitted to the PDSCH is rate-matched to the symbols #5-#7 and transmitted from the base station to the UE, or after the data transmitted to the PDSCH is rate-matched to the symbols #5-#8, puncturing is performed on the symbol #8, and the actual PDSCH transmitting and receiving is performed on the symbols #5-#7. In this state, when the actual valid code rate of the PDSCHs that are repeatedly transmitted exceeds 0.95 or 0.932, the PDSCH transmitting and receiving is not performed, and the UE does not receive the PDSCH.

Operation 6: When the configuration of Step 3 is received and the signaling (DCI format 2_0) is correctly received, the UE does not expect that the symbols assigned to be the first PDSCH among the PDSCHs that are PDSCH repeated transmitted and received are indicated to be the UL symbols by Step 3, and when at least one of the symbols assigned to be other PDSCHs other than the first PDSCH is indicated to be the UL by Step 3, the UE receives the PDSCH with respect to the other symbols except the symbol indicated to be the UL. For example, when one of the other PDSCHs is scheduled to the symbols #5-#8 in one slot, and the symbol #8 among them is configured to be the UL by Step 3, the UE receives the PDSCH from the symbols #5-#7. In this state, the data transmitted to the PDSCH is rate-matched to the symbols #5-#7 and transmitted from the base station to the UE, or after the data transmitted to the PDSCH is rate-matched to the symbols #5-#8, puncturing is performed on the symbol #8, and the actual PDSCH transmitting and receiving is performed on the symbols #5-#7. In this state, when the actual valid code rate of the PDSCHs that are repeatedly transmitted exceeds 0.95 or 0.932, the PDSCH transmitting and receiving is not performed, and the UE does not receive the PDSCH.

Operation 7: When the configuration of Step 3 is received and the signaling (DCI format 2_0) is correctly received, the UE does not expect that the symbols assigned to be the first PDSCH among the PDSCHs that are PDSCH repeated transmitted and received are indicated to be the UL symbols by Step 3, and when at least one of the symbols assigned to be other PDSCHs other than the first PDSCH is indicated to be the UL symbol (or flexible symbol) by Step 3, the UE does not perform receiving the PDSCH. In other words, the base station does not perform receiving the PDSCH. In an example, when a total of three PDSCHs are repeatedly transmitted, which are sequentially referred to as PDSCH 1, PDSCH 2, and PDSCH 3, the UE does not expect that the symbols scheduled to PDSCH 1 are indicated to be the UL by Step 3. In contrast, although the symbols scheduled to PDSCH 2 or PDSCH 3 may be indicated to be the UL symbols (or flexible symbols) by Step 3, when one of the symbols of PDSCH 2 is indicated to be the UL symbol (or flexible symbol) by Step 3, the UE does not expect receiving the PDSCH. When all symbols of PDSCH 3 are not indicated to be the UL symbols (or flexible symbols) by Step 3, the UE receives the PDSCH.

Operation 8: When the configuration of Step 3 is received and the signaling (DCI format 2_0) is correctly received, the UE does not expect that the symbols assigned to be the first PDSCH among the PDSCHs that are PDSCH repeated transmitted and received are indicated to be the UL symbols by Step 3, and when at least one of the symbols assigned to be other PDSCHs other than the first PDSCH is indicated to be the UL symbols by Step 3, the UE does not perform receiving the PDSCH. In other words, the base station does not perform receiving the PDSCH. In an example, when a total of three PDSCHs are repeatedly transmitted, which are sequentially referred to as PDSCH 1, PDSCH 2, and PDSCH 3, the UE does not expect that the symbols scheduled to PDSCH 1 are indicated to be the UL by Step 3. In contrast, although the symbols scheduled to PDSCH 2 or PDSCH 3 may be indicated to be the UL symbols by Step 3, when one of the symbols of PDSCH 2 is indicated by Step 3 to be the UL symbol, the UE does not expect receiving the PDSCH. When all symbols of PDSCH 3 are not indicated to be the UL symbol by Step 3, the UE receives the PDSCH.

Operation 9: When the configuration of Step 3 is received and the signaling (DCI format 2_0) is correctly received, the UE does not expect that the symbols assigned to be the first PDSCH among the PDSCHs that are PDSCH repeated transmitted and received are indicated to be the UL symbols by Step 3, and when at least one of the symbols assigned to be other PDSCHs other than the first PDSCH is indicated to be the UL symbols by Step 3, the UE does not transmit the PDSCH with respect to the symbols, and after the UL symbol, transmits the PDSCH with respect to the DL (or flexible) symbols capable of PDSCH transmission. In an example, in a situation in which a total of two PDSCHs in one slot are sequentially scheduled to PDSCH 1 and PDSCH 2 having the same length to be repeatedly transmitted and received, symbols assigned to be PDSCH 1 are indicated to be the DL symbols by Step 3, and when some of symbols assigned to be PDSCH 2 are indicated to be the UL symbols (or flexible symbols) by Step 3, the UE determines that, after the UL symbols (or flexible symbols) indicated by Step 3, PDSCH 2 are transmitted and received, in the same slot, in DL symbols to which all PDSCH 2 are assigned. In other words, the UE regards that the time resource domain in which PDSCH 2 is transmitted and received is delayed. The delay of PDSCH 2 in a slot is allowed. When there is no DL symbol to which all PDSCH 2 are assigned, the UE regards that the PDSCH 2 transmitting and receiving is omitted. In another example, in a situation in which a total of three PDSCHs, that is, PDSCH 1, PDSCH 2, and PDSCH 3, are scheduled to be repeatedly transmitted and received in one slot, when PDSCH 2 is delayed, PDSCH 3 is further delayed to be transmitted and received after PDSCH 2.

Operation 10: When the configuration of Step 3 is received and the signaling (DCI format 2_0) is correctly received, the UE does not expect that the symbols assigned to be the first PDSCH among the PDSCHs that are PDSCH repeated transmitted and received are indicated to be the UL symbols by Step 3, and when at least one of the symbols assigned to be other PDSCHs other than the first PDSCH is indicated to be the UL symbols by Step 3, the UE does not transmit the PDSCH with respect to the symbols, and after the UL symbol, transmits the PDSCH with respect to the DL symbols capable of PDSCH transmission. In an example, in a situation in which a total of two PDSCHs in one slot are sequentially scheduled to PDSCH 1 and PDSCH 2 having the same length to be repeatedly transmitted and received, the symbols assigned to be PDSCH 1 are indicated to be the DL symbols (or flexible symbols) by Step 3, and when some of the symbols assigned to be PDSCH 2 are indicated to be the UL symbols (or flexible symbols) by Step 3, the UE determines that, after the UL symbols (or flexible symbols) indicated by Step 3, PDSCH 2 are all transmitted and received, in the same slot, in DL symbols (or flexible symbols) to which all PDSCH 2 are assigned. In other words, the UE regards that the time resource domain in which PDSCH 2 is transmitted and received is delayed. The delay of PDSCH 2 in a slot is allowed. When there is no DL symbol (or flexible symbol) to which all PDSCH 2 are assigned, the UE regards that the PDSCH 2 transmitting and receiving is omitted. In another example, in a situation in which a total of three PDSCHs, that is, PDSCH 1, PDSCH 2, and PDSCH 3, are scheduled to be repeatedly transmitted and received in one slot, when PDSCH 2 is delayed, PDSCH 3 is further delayed to be transmitted and received after PDSCH 2.

Operation 11: When the configuration of Step 3 is received and the signaling (DCI format 2_0) is correctly received, the UE receives scheduling of the PDSCH repeated transmission, and when at least one of the symbols assigned to be each PDSCH is indicated to be the UL symbol (or flexible symbol) by Step 3 with respect to the PDSCHs to be repeatedly transmitted, the UE regards that the PDSCH transmitting and receiving is omitted. For example, in a situation in which PDSCH 1 and PDSCH 2 are scheduled to be repeatedly transmitted, when at least one of the symbols assigned to be PDSCH 1 is indicated to be the UL. (or flexible symbol) by Step 3, the UE does not perform the PDSCH 1 transmitting and receiving and receives PDSCH 2 only.

Operation 12: When the configuration of Step 3 is received and the signaling (DCI format 2_0) is correctly received, the UE receives scheduling of the PDSCH repeated transmission, and when at least one of the symbols assigned to be each PDSCH is indicated to be the UL symbol by Step 3 with respect to the PDSCHs to be repeatedly transmitted, the UE regards that the PDSCH transmitting and receiving is omitted. For example, in a situation in which PDSCH 1 and PDSCH 2 are scheduled to be repeatedly transmitted, when at least one of the symbols assigned to be PDSCH 1 is indicated to be the UL symbol by Step 3, the UE does not perform the PDSCH 1 transmitting and receiving and receives PDSCH 2 only.

Operation 13: When the configuration of Step 3 is received, but the signaling (DCI format 2_0) is not correctly received, or when the signaling (DCI format 2_0) is received, but it is within a PUSCH preparation time $T_{proc,2}$ directly after the symbol in which the signaling (DCI format 2_0) is transmitted and received, the UE does not know slot information indicated in the signaling. In detail, as the DL symbol information or the UL symbol information in the slot indicated in Step 1 or 2 is not changed again in Step 3, the UE may determine the pieces of information even when the UE does not know Step 3 information, and when a set of specific symbols in a slot is determined by Step 1 or 2 to be flexible symbols, the UE, when not know the Step 3 information, may not know whether the symbol is indicated by Step 3 to be the UL symbol, the DL symbol, or the flexible symbol. Accordingly, when at least one of the symbols scheduled to the PDSCH repeated transmission is determined to be the UL symbol (or flexible symbol) by Step 1 or 2, the UE may omit all PDSCH repeated receiving. Alternatively, when at least one of the symbols scheduled to the PDSCH repeated transmission is determined to be the UL symbol (or flexible symbol) by Step 1 or 2, the UE omit only PDSCH receiving corresponding thereto. In other words, when symbols assigned to be some of the PDSCHs that are repeatedly transmitted are all configured to be to be the DL symbols by Step 1 or 2, the UE receives the PDSCH. Alternatively, the UE determines that the PDSCH repeated transmission scheduling information are all valid and receives all PDSCHs. Alternatively, the UE receives only information about the first PDSCH transmission among the PDSCH repeated transmission scheduling information, regardless of the symbol information configured in Step 1 or 2, and the UE omits the other PDSCH transmitting and receiving.

Operation 14: When the configuration of Step 3 is received, but the signaling (DCI format 2_0) is not correctly received, or when the signaling (DCI format 2_0) is received, but it is within a PUSCH preparation time $T_{proc,2}$ directly after the symbol in which the signaling (DCI format 2_0) is transmitted and received, the UE does not expect that the symbols to which the first PDSCH is assigned with respect to the scheduled PDSCH repeated transmitting and receiving are indicated by Step 1 or 2 to be the UL symbol or flexible symbol, or even when the symbols are indicated by Step 1 or 2 to be a flexible symbol, the UE receives the first PDSCH. When, with respect to the scheduled PDSCH repeated transmitting and receiving, at least one of symbols assigned to subsequent PDSCHs except the first PDSCH is indicated by Step 1 or 2 to be the UL symbol or flexible symbol, the UE does not perform receiving the PDSCH. For example, in a situation in which three PDSCHs are repeatedly transmitted and received, when one of the symbols assigned to the second PDSCH is indicated by Step 1 or 2 to be a flexible symbol, and the symbols assigned to the other first PDSCH and third PDSCH are all indicated to be DL symbols, the UE performs receiving the first PDSCH and the third PDSCH, except the second PDSCH.

Although the above description of the operation is limited to the PDSCHs scheduled by the DCI, the description may be sufficiently applied to SPS PDSCHs that are transmitted and received without scheduling by separate DCI. Furthermore, as the first transmitted and received SPS PDSCH of the SPS PDSCHs is scheduled by the DCI, the SPS PDSCH is regarded to be the PDSCH scheduled by the DCI.

Figure 17:
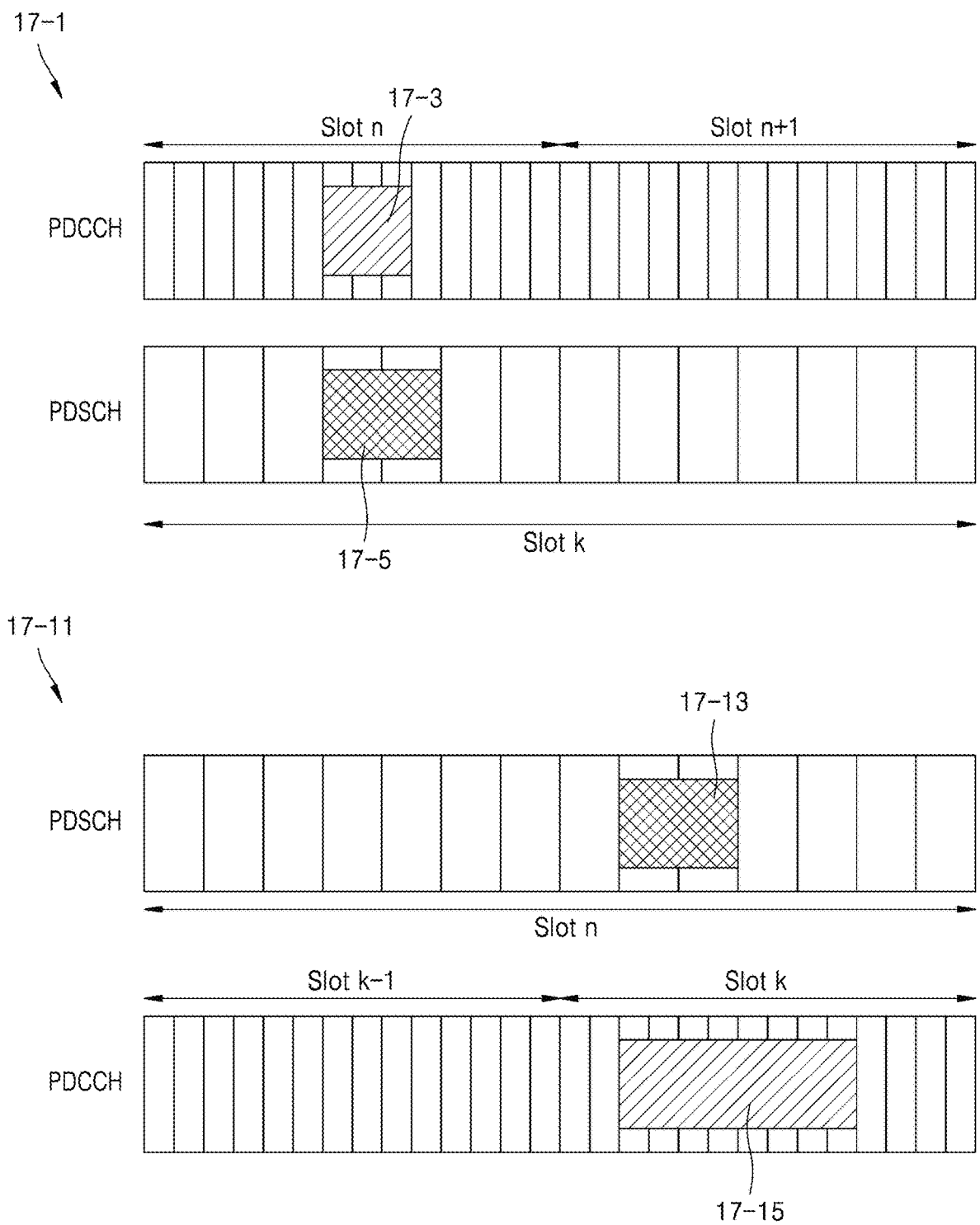
FIG. 17 illustrates a data transmission method according to an embodiment of the disclosure.

FIG. 17 illustrates a data transmission method according to an embodiment of the disclosure.

When the UE receives PDSCH scheduling by one piece of DCI, a time resource assignment information field value m included in the DCI may provide a m+1 index row of the time resource assignment information table. Time resource assignment table may be configured as shown in Table 17 below.

TABLE 17

| Row index | dmrs-TypeA-Position | PDSCH mapping type | $K_0$ | S | L | Repetition factor |
|---|---|---|---|---|---|---|
| 1 | 2 | Type A | 0 | 2 | 12 | 1 |
| 2 | 2 | Type A | 0 | 2 | 10 | 2 |
| m + 1 | ... | ... | ... | ... | ... | ... |

In Table 17, dmrs-TypeA-Position is information informing whether, when a DMRS has a PDSCH mapping type A pattern, the DMRS is located at the second or third position in a slot, which may be configured with a higher signal. A dmrs-TypeA-Position value may not be applied to a PDSCH mapping type B. A PDSCH mapping type may be a field indicating position information of a DMRS existing in a PDSCH, and when it is a Type A, the DMRS may exist at a fixed symbol position in a slot regardless of the start time point and length at which the PDSCH is scheduled, and when it is a Type B, the DMRS may exist in a start symbol where the PDSCH is scheduled. $K_0$ denotes offset information between a slot where a PDCCH exists and a slot where a PDSCH scheduled by the PDCCH, S denotes a start symbol of PDSCH, L denotes the length of PDSCH, and Repetition denotes a frequency at which the PDSCH is repeatedly transmitted. Repetition information may not exist.

Accordingly, the UE may receive the time resource assignment field value m of DCI by identifying the time resource assignment information of the scheduled PDSCH and DMRS position information according to a slot offset corresponding to a m+1 index of the time resource assignment table, SLIV including a combination of S and L (or, individual information of S and L), and PDSCH mapping type.

According to an embodiment of the disclosure, Information about a slot to which a PDSCH is assigned is $$\left\lfloor n \cdot \frac{2^{\mu_{PDSCH}}}{2^{\mu_{PDCCH}}} \right\rfloor + K_0,$$

where n may be a slot in which scheduling DCI is transmitted and received. $K_0$ denotes a value determined based on subcarrier spacing information of PDSCH, and $\mu_{PDSCH}$ and $\mu_{PDCCH}$ denote pieces of subcarrier spacing configuration information of PDSCH and PDCCH, respectively. FIG. 17 shows an example thereof. In 17-1 (or 17-11), the UE receives PDCCH 17-3 or 17-13 in a slot n and transmit and receives PDSCH 17-5 or 17-15 scheduled by the PDCCH in a slot k, where the slot $$k \left\lfloor n \cdot \frac{2^{\mu_{PDSCH}}}{2^{\mu_{PDCCH}}} \right\rfloor.$$

A situation in which the subcarrier spacings of PDCCH and PDSCH are different from each other may include when cells or carriers where PDCCH and PDSCH are transmitted and received are different from each other and the subcarrier spacings configured in the cells or carriers are different from each other, or when PDCCH and PDSCH exist in the same cell or carrier, but have different BWPs (frequency BWPs), each BWP being configured with different subcarrier spacings. The value of $\mu_{PDSCH}$ and $\mu_{PDCCH}$ is 0 for 15 kHz, 1 for 30 kHz, 2 for 60 kHz, and 3 for 120 kHlz.

A start symbol S may be determined by the following two methods.

Method 17-1: When the UE receives a higher signal indicating reference time point change information of the start symbol S to which a PDSCH is assigned, and receives a PDSCH scheduled by a DCI format including CRC scrambled to C-RNTI, MCS-RNTI, or CS-RNTI having a PDSCH mapping type B and a $K_0$ value of 0, a first symbol $S_0$ of a PDCCH monitoring time point (or PDCCH resource or CORESET) when the start symbol S detects the DCI format may be determined to be a reference.

When a subcarrier spacing and a cyclic prefix of PDCCH and PDSCH are the same, the above-described method 1 may be employed. According to an embodiment of the disclosure, when a subcarrier spacing or a cyclic prefix of PDCCH and PDSCH are different from each other, at least one of the following detailed methods may be employed with the method 17-1. In other words, some or the entire combination of the following detailed methods may be employed with the method 17-1.

Method 17-1-1: the UE regards or determine, to be $S_0$, the first symbol of the symbols of PDSCH that is entirely or partially overlapped with the first symbol of PDCCH where a DCI format for scheduling the PDSCH is detected.

Method 17-1-2: the UE regards or determine, to be $S_0$, the last symbol of the symbols of PDSCH that is entirely or partially overlapped with the first symbol of PDCCH where the DCI format for scheduling the PDSCH is detected.

The methods, not limited to a situation in which a subcarrier spacing or a cyclic prefix of PDCCH and PDSCH are different from each other, may be commonly employed in a general situation.

Method 17-2: In all situations other than the situation described in the method 17-1, the UE may determine the start symbol S based on a first symbol $S_0$ ($S_0$=0) of a slot in which PDSCH is scheduled.

According to an embodiment of the disclosure, only when the subcarrier spacing or cyclic prefix of PDCCH and PDSCH is the same, the method 17-1 may be employed. Alternatively, in a PDCCH and PDSCH cross carrier scheduling situation, the method 17-1 may not be employed. In other words, the UE may employ a method 17-2.

In another example, the method 17-1 may be employed only when the subcarrier spacing value $\mu_{PDCCH}$ of PDCCH is equal to or greater than the subcarrier spacing value $\mu_{PDSCH}$ of PDSCH.

In another example, when the subcarrier spacing value $\mu_{PDCCH}$ of PDCCH is less than the subcarrier spacing value $\mu_{PDSCH}$ of PDSCH, and a start symbol for transmitting PDCCH does not belong to a slot indicated the transmitted $k_0$, or is earlier than the first symbol of a slot indicated by $k_0$, the method 17-1 may not be employed. In other words, the UE may employ the method 17-2.

The length L may mean L consecutive symbols, to which PDSCH is assigned, from the start symbol, and may be determined from the SLIV value by Equation 17-1 below.

if($L$−1)≤7then SLIV=14·($L$−1)+Selse SLIV=14·(14−$L$+1)+(14−1−S) where 0<$L$≤14−S  [Equation 17-1]

For a normal cyclic prefix, the UE determines that only values of S and L satisfying that $S_0$+S+L≤14 are the time resource assignment information of a valid PDSCH. For an extended cyclic prefix, the UE determines that only values of S and L satisfying that $S_0$+S+L≤12 are the time resource assignment information of a valid PDSCH. For a combination of S and L that do not satisfy the above-described conditions, the UE may determine that the DCI information has been incorrectly determined and regard it to be an error case.

According to an embodiment of the disclosure, Information about a slot to which a PDSCH is assigned is $$\left\lfloor n \cdot \frac{2^{\mu_{PDSCH}}}{2^{\mu_{PDCCH}}} \right\rfloor + K_0,$$

where n may be a slot in which DCI is transmitted and received. $K_0$ may denote a value determined based on the subcarrier spacing information of PDSCH, and $\mu_{PDSCH}$ and $\mu_{PDCCH}$ may denote pieces of subcarrier spacing configuration information of PDSCH and PDCCH, respectively. FIG. 17 illustrates an example thereof. In 17-1 (or 17-11), the UE receives PDCCH 17-3 or 17-13 in a slot n, and PDSCH 17-5 or 17-15 scheduled by the PDCCH is transmitted and received in a slot k. The slot k is $$\left\lfloor n \cdot \frac{2^{\mu_{PDSCH}}}{2^{\mu_{PDCCH}}} \right\rfloor.$$

A situation in which the subcarrier spacings of PDCCH and PDSCH are different from each other may include a case in which PDCCH and PDSCH are transmitted and received in different cells or carriers and subcarrier spacings configured in the cells or carriers are different from each other, or a case in which, while PDCCH and PDSCH exist in the same cell or carrier, both have different BWPs and the BWPs are configured with different subcarrier spacings. Values of $\mu_{PDSCH}$ and $\mu_{PDCCH}$ are 0 for 15 kHz, 1 for 30 kHz, 2 for 60 kHz, and 3 for 120 kHz.

The start symbol S may be determined by the following two methods.

Method 17-3: When the UE receives a higher signal indicating reference time point change information of the start symbol S to which a PDSCH is assigned, and receives a PDSCH scheduled by a DCI format including CRC scrambled to C-RNTI, MCS-RNTI, or CS-RNTI having a PDSCH mapping type B and a $K_0$ value of 0, the first symbol $S_0$ of a PDCCH monitoring time point (or PDCCH resource or CORESET) when the start symbol S detects the DCI format may be determined to be a reference. In detail, $S_2$ denotes a first symbol of a PDCCH monitoring time point (or CORESET) in a slot (or cell or BWP) in which the PDCCH is scheduled, and $S_1$ may denotes a symbol index value of a slot (or cell or BWP) in which the PDSCH is scheduled. A relation between $S_2$ and $S_1$ may be determined by the following Conditional Statement 17-2. $S_{symbol}^{slot}$ is a symbol number in a slot, in which a normal cyclic prefix is 14 and an extended cyclic prefix is 12.

[Conditional Statement 17-2]

If $\mu_{PDSCH} \geq \mu_{PDCCH}$ and $S_2 \geq A^i$
$$S_1 = \left\lfloor S_2 - A^i \cdot \frac{2^{\mu_{PDSCH}}}{2^{\mu_{PDCCH}}} \right\rfloor \text{ where } A^i = \left\lfloor \left(1 - \frac{2^{\mu_{PDCCH}}}{2^{\mu_{PDSCH}}}\right) \cdot S_{symbol}^{slot} \right\rfloor$$

Elseif $\mu_{PDSCH} < \mu_{PDCCH}$
$$S_1 = \left\lceil \frac{S_2 + (S_{symbol}^{slot}/B^i) \cdot \text{mod}(n, B^i)}{B^i} \right\rceil \text{ where } B^i = \frac{2^{\mu_{PDCCH}}}{2^{\mu_{PDSCH}}}$$

Alternatively, Conditional Statement 17-3 below may be employed.

[Conditional Statement 17-3]

If $\mu_{PDSCH} \geq \mu_{PDCCH}$ and $S_2 \geq A^i$
$$S_1 = \left\lfloor S_2 - A^i \cdot \frac{2^{\mu_{PDSCH}}}{2^{\mu_{PDCCH}}} \right\rfloor \text{ where } A^i = \left\lfloor \left(1 - \frac{2^{\mu_{PDCCH}}}{2^{\mu_{PDSCH}}}\right) \cdot S_{symbol}^{slot} \right\rfloor$$

Elseif $\mu_{PDSCH} < \mu_{PDCCH}$
$$S_1 = \left\lceil \frac{S_2 + (S_{symbol}^{slot}/B^i) \cdot \text{mod}(n, B^i)}{B^i} \right\rceil \text{ where } B^i = \frac{2^{\mu_{PDCCH}}}{2^{\mu_{PDSCH}}}$$

When $\mu_{PDSCH} \geq \mu_{PDCCH}$, and $S_2 < A^i$, the UE does not expect that the method 17-3 is employed. In other words, a method 17-4 is determined to be employed. In the above-described Conditional Statement 17-2 or Conditional Statement 17-3, "floor⌊ ⌋" or "ceiling ⌈ ⌉" may be interchangeable. Furthermore, "≤" and "<" may be interchangeably applied to Conditional Statement 17-2 or Conditional Statement 17-3. Furthermore, "≥" and ">" may be interchangeably applied to Conditional Statement 17-2 or Conditional Statement 17-3.

Method 17-4: For all cases other than the situation described in the method 17-3, the UE may determine the start symbol S based on the first symbol $S_1$ ($S_1$=0) in a slot in which a PDSCH is scheduled.

According to an embodiment of the disclosure, only when the subcarrier spacing or cyclic prefix of PDCCH and PDSCH is the same, the method 17-3 may be employed. Alternatively, in a PDCCH and PDSCH cross carrier scheduling situation, the method 17-3 may not be employed. In other words, the UE may employ the method 17-4.

In another example, the method 14A-3 may be employed only with the subcarrier spacing value $\mu_{PDCCH}$ of PDCCH is equal to or greater than the subcarrier spacing value $\mu_{PDSCH}$ of PDSCH.

In another example, when the subcarrier spacing value $\mu_{PDCCH}$ of PDCCH is less than the subcarrier spacing value $\mu_{PDSCH}$ of PDSCH, and the start symbol for transmitting a PDCCH does not belong to a slot indicated by $k_0$, or is earlier than the first symbol of the slot indicated by $k_0$), the method 17-3 may not be employed. In other words, the UE employs the method 17-4.

The length L may mean L consecutive symbols, to which PDSCH is assigned, from the start symbol, and may be determined from the SLIV value by Conditional Statement 17-5 below.

if(L−1)≤7then SLIV=14·(L−1)+Selse SLIV=14·(14−L+1)+(14−1−S) where 0<L≤14−S [Conditional Statement 17-5]

For a normal cyclic prefix, the UE determines that only values of S and L satisfying that $S_1$+S+L≤14 are the time resource assignment information of a valid PDSCH. For an extended cyclic prefix, the UE determines that only values of S and L satisfying that $S_1$+S+L≤12 are the time resource assignment information of a valid PDSCH. For a combination of S and L that do not satisfy the above-described conditions, the UE may determine that the DCI information has been incorrectly determined and regard it to be an error case.

Figure 18:
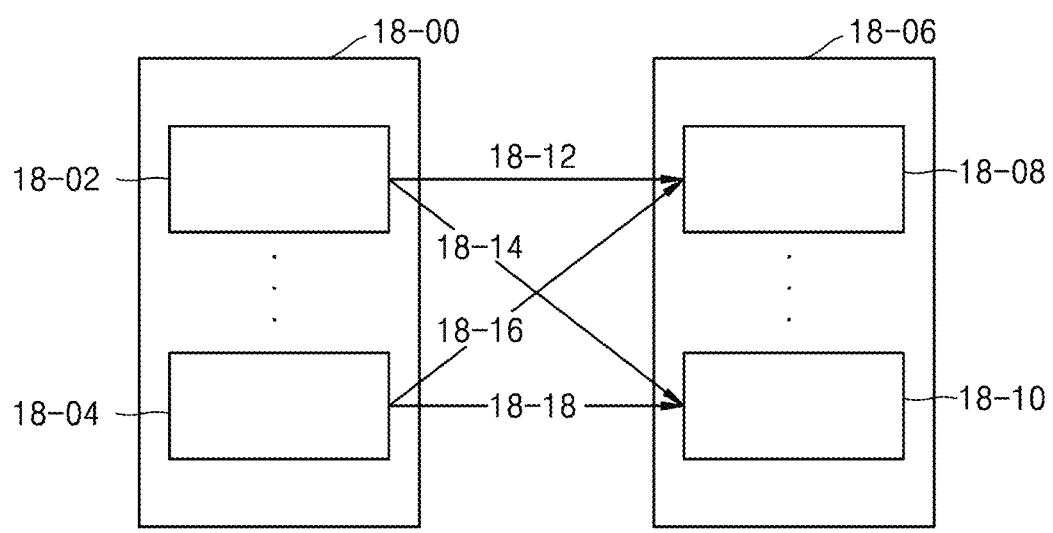
FIG. 18 illustrates a method in which cross carrier scheduling is employed, according to an embodiment of the disclosure.

Next, in FIG. 18, a method in which the method 17-1 and the method 17-2 are employed in a cross carrier scheduling situation, including the above descriptions in FIG. 17, is described.

FIG. 18 illustrates a method in which cross carrier scheduling is employed, according to an embodiment of the disclosure.

In the cross carrier scheduling, a cell 18-00 in which control information is transmitted and received and a cell 18-06 in which data is transmitted and received. For example, the cell 18-00 in which control information is transmitted and received is referred to as a scheduling cell or a primary cell, and a cell in which data information is transmitted and received according to the control information is referred to as a scheduled cell or a secondary cell. Furthermore, one or a plurality of BWPs 18-02 and 18-04 may exist in the cell 18-00 in which control information is transmitted and received, and one or a plurality of BWPs 18-08 and 18-10 may exist in the cell 18-06 in which data information is transmitted and received.

The above-described methods 17-1 and 17-2 of FIG. 17 may be employed in FIG. 18 as follows. In the scheduling cell 18-00, a BWP in which control information is transmitted and received may be the BWP 18-02, and in the scheduled cell 18-06, a BWP that may be scheduled according to the control information may be BWPs 18-08 and 18-10. For example, a cross carrier scheduling operation may be possible through an indicator (carrier indicator) that indicates a cross carrier in a control information field and a field (BWP indicator) that indicates a bandwidth. Alternatively, a case in which a specific BWP is activated in the cell 18-06 according to the previously different higher signal or L1 signal. The BWPs 18-02 and 18-08 may be configured to have the same subcarrier spacing based on the higher signal, previously, and the BWPs 18-02 and 18-10 may be configured to have different subcarrier spacings according to the previously higher signal.

When the data information that is scheduled according to the control information is transmitted and received (18-12) in the BWP 18-08, the UE may determine that the method 17-1 is employed, and when the data information that is scheduled according to the control information is transmitted and received (18-14) in the BWP 18-18, the UE may determine that the method 17-2 is employed.

For example, when the subcarrier spacings of the BWPs 18-02 and 18-08 are 15 kHz, and the subcarrier spacings of the BWPs 18-04 and 18-10 are 30 kHz, and when cross carrier scheduling is performed (18-12) from the BWP 18-02 to the BWP 18-08 and cross carrier scheduling is performed (18-18) from the BWP 18-04 to the BWP 18-10, the UE determines that the above-described method 17-1 is employed, and when cross carrier scheduling is performed (18-14) from the BWP 18-02 to the BWP 18-10 and cross carrier scheduling is performed (18-16) from the BWP 18-04 to the BWP 18-08, the UE may determine that the method 17-2 is employed.

Even when, in FIG. 18, a plurality of BWPs are configured in one cell according to the higher signal, only one (or a plurality of) BWP is activated, and the UE may transmit and receive the control information or the data information with the base station through the activated BWP only.

Furthermore, according to an embodiment of the disclosure, a method in which the method 17-1 or method 17-2 is employed according to whether the subcarrier spacings of BWPs in which the control information and the data information are transmitted and received are the same, in a cross carrier scheduling situation, is described, it is possible that the method 17-1 or method 17-2 is employed in the same manner according to whether the cyclic prefix is the same, and also it is possible to employ the method considering whether both of the cyclic prefix and the subcarrier spacing are the same.

Alternatively, the UE may receive data information from the base station regardless of the cross carrier scheduling through the following methods 18-1 and 18-2 in addition to the methods 17-1 and 17-2.

Information about a slot to which a PDSCH is assigned is $$\left\lfloor n \cdot \frac{2^{\mu_{PDSCH}}}{2^{\mu_{PDCCH}}} \right\rfloor + K_0,$$

where n may be a slot in which scheduling DCI is transmitted and received. $K_0$ may denote a value determined based on the subcarrier spacing information of PDSCH, and $\mu_{PDSCH}$ and $\mu_{PDCCH}$ may denote pieces of subcarrier spacing configuration information of PDSCH and PDCCH, respectively. The slot k is $$\left\lfloor n \cdot \frac{2^{\mu_{PDSCH}}}{2^{\mu_{PDCCH}}} \right\rfloor.$$

A situation in which the subcarrier spacings of PDCCH and PDSCH are different from each other may include a case in which PDCCH and PDSCH are transmitted and received in different cells or carriers and subcarrier spacings configured in the cells or carriers are different from each other, or a case in which, while PDCCH and PDSCH exist in the same cell or carrier, both have different BWPs (frequency BWPs) and the BWPs are configured with different subcarrier spacings. The values of $\mu_{PDSCH}$ and $\mu_{PDCCH}$ are 0 for 15 kHz, 1 for 30 kHz, 2 for 60 kHz, and 3 for 120 kHz.

The start symbol S may be determined by the following two methods.

Method 18-1: When the UE receives a higher signal indicating reference time point change information of the start symbol S to which a PDSCH is assigned, and receives a PDSCH scheduled by a DCI format including CRC scrambled to C-RNTI, MCS-RNTI, or CS-RNTI having a PDSCH mapping type B and a $K_0$ value of 0, and when the subcarrier spacings of PDCCH and PDSCH (or cyclic prefix) are the same, the first symbol $S_0$ of a PDCCH monitoring time point (or PDCCH resource or CORESET) when the start symbol S detects the DCI format may be determined to be a reference.

Method 18-2: In all situations other than the situation described in the method 18-1, the UE may determine the start symbol S based on a first symbol $S_0$ ($S_0=0$) of a slot in which PDSCH is scheduled FIG. 15 illustrates a structure of the UE in a wireless communication system, according to an embodiment of the disclosure.

Figure 15:
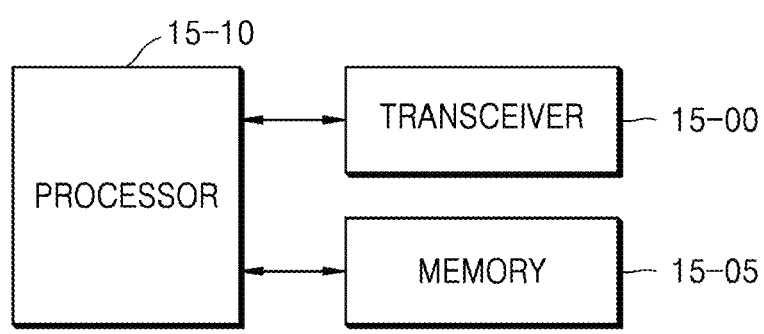
FIG. 15 illustrates a structure of user equipment in a wireless communication system, according to an embodiment of the disclosure.

Referring to FIG. 15, the UE may include a transmitting and receiving unit (a transceiver) 15-00, a memory 15-05, and a processor 15-10. The transmitting and receiving unit 15-00 and the processor 15-10 of the UE may be operated according to the above-described UE's communication method. However, the constituent elements of the UE are not limited to the above-described example. For example, the UE may include constituent elements more or less than the above-described constituent elements. In addition, the transmitting and receiving unit 15-00, the memory 15-05, and the processor 15-10 may be implemented in one chip form.

The transmitting and receiving unit 15-00 may transmit and receive signals with the base station. The signal may include control information and data. To this end, the transmitting and receiving unit 15-00 may include an RF transmitter for up-converting and amplifying the frequency of a signal to be transmitted, and an RF receiver for low-noise amplifying a received signal and down-converting the frequency of a signal. However, this is a mere embodiment of the transmitting and receiving unit 15-00, and the constituent elements of the transmitting and receiving unit 15-00 are not limited to the RF transmitter and the RF receiver.

Furthermore, the transmitting and receiving unit 15-00 may receive a signal through a wireless channel and output the received signal to the processor 15-10, and transmit the signal output from the processor 15-10 through the wireless channel.

The memory 15-05 may store a program and data necessary for an operation of the UE. Furthermore, the memory 15-05 may store control information or data included in a signal transmitted and received by the UE. The memory 15-05 may include storage media such as read-only memory (ROM), random access memory (RAM), hard disks, compact disc-ROMs (CD-ROMs), digital versatile discs (DVDs), and the like, or a combination of the storage media. Furthermore, the memory 15-05 may include a plurality of memories.

Furthermore, the processor 15-10 may control a series of processes so that the UE operates according to the above-described embodiment. For example, the processor 15-10 may control the constituent elements of the UE to receive DCI including two layers so as to simultaneously receive a plurality of PDSCHs. The processor 15-10 may include a plurality of processors, and the processor 15-10 may perform control operations of the constituent elements of the UE by performing a program stored in the memory 15-05.

Figure 16:
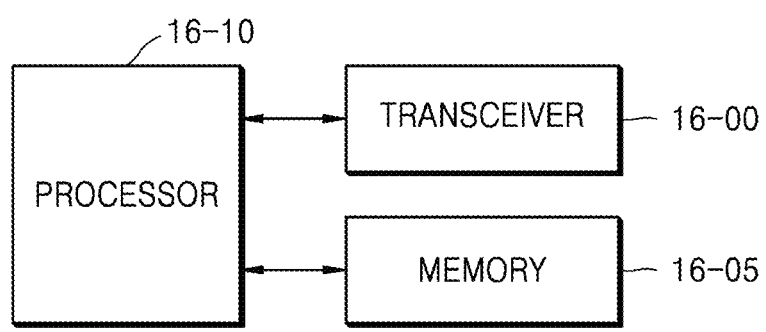
FIG. 16 illustrates a structure of a base station in a wireless communication system, according to an embodiment of the disclosure.

FIG. 16 illustrates a structure of a base station in a wireless communication system, according to an embodiment of the disclosure.

Referring to FIG. 16, the base station may include a transmitting and receiving unit(a transceiver) 16-00, a memory 16-05, and a processor 16-10. The transmitting and receiving unit 16-00 and the processor 16-10 of the base station may operate according to the above-described communication method of the base station. However, the constituent elements of the base station are not limited to the above-described example. For example, the base station may include more or less constituent elements than the above-described constituent elements. In addition, the transmitting and receiving unit 16-00, the memory 16-05, and the processor 16-10 may be implemented in one chip form.

The transmitting and receiving unit 16-00 may transmit and receive a signal with the UE. The signal may include control information and data. To this end, the transmitting and receiving unit 16-00 may include an RF transmitter for up-converting and amplifying the frequency of a signal to be transmitted, and an RF receiver for low-noise amplifying a received signal and down-converting the frequency of a signal. However, this is a mere embodiment of the transmitting and receiving unit 16-00, and the constituent elements of the transmitting and receiving unit 16-00 are not limited to the RF transmitter and the RF receiver.

Furthermore, the transmitting and receiving unit 16-00 may receive a signal through a wireless channel and output the received signal to the processor 16-10, and transmit the signal output from the processor 16-10 to through the wireless channel.

The memory 16-05 may store a program and data necessary for an operation of the base station. Furthermore, the memory 16-05 may store control information or data included in a signal transmitted and received by the base station. The memory 16-05 may include storage media such as ROM, RAM, hard disks, CD-ROMs, DVDs, and the like, or a combination of the storage media. Furthermore, the memory 16-05 may include a plurality of memories.

Furthermore, the processor 16-10 may control a series of processes so that the base station operates according to the above-described embodiment. For example, the processor 16-10 may control each of the constituent elements of the base station to configure two layers of DCIs including assignment information about a plurality of PDSCHs and transmit the DCIs. The processor 16-10 may include a plurality of processors, and the processor 16-10 may perform control operations of the constituent elements of the base station by performing a program stored in the memory 16-05.

The methods according to the embodiments described in the claims or specification of the disclosure may be implemented in the form of hardware, software, or a combination of hardware and software.

When implemented by software, a computer-readable storage medium for storing one or more programs (software modules) may be provided. The one or more programs stored in a computer-readable storage medium may be configured for execution by one or more processors in an electronic apparatus (device). The one or more programs may include instructions to execute, by an electronic apparatus, the methods according to the embodiments described in the claims or specification of the disclosure.

The programs (software modules, software) may be stored in RAM, non-volatile memory including flash memory, ROM, electrically erasable programmable ROM (EEPROM), magnetic disc storage devices, CD-ROMs, DVDs, or different forms of optical storage devices, magnetic cassettes, or the like. Alternatively, the programs may be stored in a memory configured with a combination of some or all thereof. Furthermore, each constituent memory may include a plurality of memories.

Furthermore, the programs may be stored in attachable storage devices that are accessible through a communication network such as Internet, Intranet, local area network (LAN), wide LAN (WLAN), or storage area network (SAN), or a communication network configured with a combination thereof. The storage device may access, via an external port, an apparatus that performs the embodiment of the disclosure. Furthermore, a separate storage device on a communication network may access an apparatus performing the embodiment of the disclosure.

According to the disclosure, in a wireless communication system, the base station may provide efficient data transmission to the UE.

In the specific embodiments of the above-described disclosure, the constituent elements included in the disclosure are expressed as singular or plural according to the specific embodiments. However, the singular or plural expressions are selected appropriately for the situation presented for convenience of explanation, and the disclosure is not limited to a singular or plural constituent element(s), and even constituent elements expressed in a plural form may be composed of a singular constituent element, or even a constituent element expressed in a singular form may be composed of a plurality of constituent elements.

The embodiments of the disclosures disclosed in the present specification and drawings are merely specific examples to easily explain the technology content of the disclosure and to help understanding of the disclosure, and are not intended to limit the scope of the disclosure. In other words, it is obvious to a skilled person in the art to which the disclosure belongs that different modified examples based on the technical idea of the disclosure can be implemented. Furthermore, the respective embodiments may be combined with each other, as necessary. For example, parts of one embodiment and another embodiment of the disclosure may be combined with each other to operate the base station and the UE. For example, parts of the first embodiment and the second embodiment of the disclosure may be combined with each other to operate the base station and the UE. Furthermore, although the embodiments are provided based on an FDD LTE system, other modified examples based on the technical concept of the disclosure may be implemented based on other systems such as a TDD LTE system, 5G, or NR system.

What is claimed is:

1. A data communication method of a user equipment, the data communication method comprising:
   receiving a higher layer signal indicating a change of a reference point of a start symbol to which a physical downlink shared channel (PDSCH) is assigned;
   detecting a format of downlink control information (DCI) including PDSCH scheduling information from a physical downlink control channel (PDCCH), the DCI including a cyclic redundancy check (CRC) scrambled to one of a cell radio network temporary identifier (C-RNTI), a modulation and coding scheme cell RNTI (MCS-RNTI), or a configured scheduling RNTI (CS-RNTI); and determining the start symbol to which the PDSCH is assigned, based on information about the format of the DCI, mapping type information of the PDSCH, and an offset value between a slot in which the PDCCH is located and a slot in which the PDSCH is located.

2. The data communication method of claim 1, wherein the determining of the start symbol to which the PDSCH is assigned comprises determining the start symbol to which the PDSCH is assigned, based on a first symbol at a monitoring point of the PDCCH where the format of the DCI is detected, when a PDSCH mapping type is a mapping type B and the offset value is 0.

3. The data communication method of claim 2, wherein the determining of the start symbol to which the PDSCH is assigned comprises determining the start symbol to which the PDSCH is assigned, based on the first symbol at the monitoring point of the PDCCH where the DCI format is detected, when subcarrier spacings of the PDCCH and the PDSCH match.

4. The data communication method of claim 3, wherein the determining of the start symbol to which the PDSCH is assigned comprises determining the start symbol to which the PDSCH is assigned, based on the first symbol at the monitoring point of the PDCCH where the DCI format is detected, when cyclic prefixes of the PDCCH and the PDSCH match.

5. The data communication method of claim 1, wherein the determining of the start symbol to which the PDSCH is assigned comprises determining the start symbol to which the PDSCH is assigned, based on a first symbol of a slot in which the PDSCH is scheduled, when a PDSCH mapping type is not a B type or the offset value is not 0.

6. The data communication method of claim 1, wherein the determining of the start symbol to which the PDSCH is assigned comprises determining the start symbol to which the PDSCH is assigned, based on a first symbol of a slot in which the PDSCH is scheduled, when cross carrier scheduling of the PDCCH and the PDSCH is configured.

7. The data communication method of claim 1, wherein, when a higher layer signal indicating the change of the reference point of the start symbol to which the PDSCH is assigned is not received, the determining of the start symbol to which the PDSCH is assigned comprises determining the start symbol to which the PDSCH is assigned, based on a first symbol of a slot in which the PDSCH is scheduled.

8. A data communication method of a base station, the data communication method comprising:

transmitting a higher layer signal indicating a change of a reference point of a start symbol to which a physical downlink shared channel (PDSCH) is assigned; and providing a downlink control information (DCI) including PDSCH scheduling information through a physical downlink control channel (PDCCH), the DCI including a cyclic redundancy check (CRC) scrambled to one of a cell radio network temporary identifier (C-RNTI), a modulation and coding scheme cell RNTI (MCS-RNTI), or a configured scheduling RNTI (CS-RNTI), wherein the start symbol to which the PDSCH is assigned is determined based on information about a format of the DCI, mapping type information of the PDSCH, and an offset value between a slot in which the PDCCH is located and a slot in which the PDSCH is located.

9. The data communication method of claim 8, wherein, when a PDSCH mapping type is a mapping type B, the offset value is 0, and subcarrier spacings of the PDCCH and the PDSCH match, the start symbol to which the PDSCH is assigned is determined based on a first symbol at a monitoring point of the PDCCH where the DCI format is detected.

10. The data communication method of claim 8, wherein, when cross carrier scheduling of the PDCCH and the PDSCH is configured, or subcarrier spacings of the PDCCH and the PDSCH are different from each other, the start symbol to which the PDSCH is assigned is determined based on a first symbol of a slot in which the PDSCH is scheduled.

11. A user equipment which performs a data communication method, the user equipment comprising:

a transceiver; and a processor coupled to the transceiver and configured to:
receive a higher layer signal indicating a change of a reference point of a start symbol to which a physical downlink shared channel (PDSCH) is assigned;

detect a format of downlink control information (DCI) including PDSCH scheduling information from a physical downlink control channel (PDCCH), the DCI including a cyclic redundancy check (CRC) scrambled to one of a cell radio network temporary identifier (C-RNTI), a modulation and coding scheme cell RNTI (MCS-RNTI), or a configured scheduling RNTI (CS-RNTI); and determine the start symbol to which the PDSCH is assigned, based on information about the format of the DCI, mapping type information of the PDSCH, and an offset value between a slot in which the PDCCH is located and a slot in which the PDSCH is located.

12. The user equipment of claim 11, wherein the processor is further configured to determine the start symbol to which the PDSCH is assigned, based on a first symbol at a monitoring point of the PDCCH where the format of the DCI is detected, when a PDSCH mapping type is a mapping type B and the offset value is 0.

13. The user equipment of claim 12, wherein the processor is further configured to determine the start symbol to which the PDSCH is assigned, based on the first symbol at the monitoring point of the PDCCH where the DCI format is detected, when subcarrier spacings of the PDCCH and the PDSCH match.

14. The user equipment of claim 13, wherein the processor is further configured to determine the start symbol to which the PDSCH is assigned, based on the first symbol at the monitoring point of the PDCCH where the DCI format is detected, when cyclic prefixes of the PDCCH and the PDSCH match.

15. The user equipment of claim 11, wherein the processor is further configured to determine the start symbol to which the PDSCH is assigned, based on a first symbol of a slot in which the PDSCH is scheduled, when a PDSCH mapping type is not a B type or the offset value is not 0.

16. The user equipment of claim 11, wherein the processor is further configured to determine the start symbol to which the PDSCH is assigned, based on a first symbol of a slot in which the PDSCH is scheduled, when cross carrier scheduling of the PDCCH and the PDSCH is configured.

17. The user equipment of claim 11, wherein the processor is configured to determine the start symbol to which the PDSCH is assigned, based on a first symbol of a slot in which the PDSCH is scheduled the start symbol, when the higher layer signal indicating the change of the reference point of the start symbol to which the PDSCH is assigned is not received.

18. A base station which performs a data communication method, the base station comprising:
   a transceiver; and
   a processor coupled to the transceiver and configured to:
      transmit a higher layer signal indicating a change of a reference point of a start symbol to which a physical downlink shared channel (PDSCH) is assigned, and
      provide a downlink control information (DCI) including PDSCH scheduling information through a physical downlink control channel (PDCCH), the DCI including a cyclic redundancy check (CRC) scrambled to one of a cell radio network temporary identifier (C-RNTI), a modulation and coding scheme cell RNTI (MCS-RNTI), or a configured scheduling RNTI (CS-RNTI),
   wherein the start symbol to which the PDSCH is assigned is determined based on information about a format of the DCI, mapping type information of the PDSCH, and an offset value between a slot in which the PDCCH is located and a slot in which the PDSCH is located.

19. The base station of claim 18, wherein the start symbol to which the PDSCH is assigned is determined based on a first symbol at a monitoring point of the PDCCH where the format of the DCI is detected, when a PDSCH mapping type is a mapping type B and the offset value is 0.

20. The base station of claim 18, wherein, when cross carrier scheduling of the PDCCH and the PDSCH is configured, or subcarrier spacings of the PDCCH and the PDSCH are different from each other, a start symbol to which the PDSCH is assigned is determined based on a first symbol of a slot in which the PDSCH is scheduled.

* * * * *